United States Patent
Shen et al.

(10) Patent No.: US 11,436,057 B2
(45) Date of Patent: Sep. 6, 2022

(54) ADMINISTRATIVE POLICY CUSTOM RESOURCE DEFINITIONS

(71) Applicant: VMware, Inc., Palo Alto, CA (US)

(72) Inventors: Jianjun Shen, Redwood City, CA (US); Danting Liu, Beijing (CN); Yang Liu, Fujian (CN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/897,627

(22) Filed: Jun. 10, 2020

(65) Prior Publication Data
US 2021/0314300 A1 Oct. 7, 2021

(30) Foreign Application Priority Data

Apr. 1, 2020 (WO) ................ PCT/CN2020/082785

(51) Int. Cl.
*G06F 9/50* (2006.01)
*H04L 49/00* (2022.01)
(Continued)

(52) U.S. Cl.
CPC ........ *G06F 9/5077* (2013.01); *G06F 9/45558* (2013.01); *G06F 9/5083* (2013.01);
(Continued)

(58) Field of Classification Search
CPC . H04L 63/0263; H04L 63/20; H04L 41/0893; H04L 49/70; G06F 9/45558; G06F 9/547; G06F 9/5077
See application file for complete search history.

(56) References Cited

U.S. PATENT DOCUMENTS 8,627,442 B2 1/2014 Ji et al.
8,683,560 B1 3/2014 Brooker et al.
(Continued)

FOREIGN PATENT DOCUMENTS

CN 106789367 A 5/2017
CN 107947961 A 4/2018
(Continued)

OTHER PUBLICATIONS

Abwnawar, Nasser. "A Policy-Based Management Approach to Security in Cloud Systems." (Year: 2020).*
(Continued)

*Primary Examiner* — John M Macilwinen
(74) *Attorney, Agent, or Firm* — Adeli LLP

(57) ABSTRACT

Some embodiments of the invention provide a method for deploying network elements for a set of machines in a set of one or more datacenters. The datacenter set is part of one availability zone in some embodiments. The method receives intent-based API (Application Programming Interface) requests, and parses these API requests to identify a set of network elements to connect and/or perform services for the set of machines. In some embodiments, the API is a hierarchical document that can specify multiple different compute and/or network elements at different levels of compute and/or network element hierarchy. The method performs automated processes to define a virtual private cloud (VPC) to connect the set of machines to a logical network that segregates the set of machines from other machines in the datacenter set. In some embodiments, the set of machines include virtual machines and containers, the VPC is defined with a supervisor cluster namespace, and the API requests are provided as YAML, files.

20 Claims, 28 Drawing Sheets

(51) Int. Cl.

| | |
|---|---|
| *H04L 45/42* | (2022.01) |
| *G06F 9/455* | (2018.01) |
| *G06F 9/54* | (2006.01) |
| *H04L 9/40* | (2022.01) |
| *H04L 61/103* | (2022.01) |
| *H04L 67/1001* | (2022.01) |
| *H04L 41/0893* | (2022.01) |
| *H04L 41/18* | (2022.01) |
| *H04L 41/5041* | (2022.01) |
| *H04L 41/50* | (2022.01) |
| *H04L 67/10* | (2022.01) |
| *H04L 12/46* | (2006.01) |
| *H04L 12/66* | (2006.01) |
| *H04L 61/50* | (2022.01) |
| *H04L 45/586* | (2022.01) |

(52) U.S. Cl.
CPC ............... *G06F 9/54* (2013.01); *G06F 9/547* (2013.01); *H04L 12/4641* (2013.01); *H04L 12/66* (2013.01); *H04L 41/0893* (2013.01); *H04L 41/18* (2013.01); *H04L 41/5048* (2013.01); *H04L 41/5077* (2013.01); *H04L 45/42* (2013.01); *H04L 45/586* (2013.01); *H04L 49/70* (2013.01); *H04L 61/103* (2013.01); *H04L 61/20* (2013.01); *H04L 63/0209* (2013.01); *H04L 63/0218* (2013.01); *H04L 63/0263* (2013.01); *H04L 63/0272* (2013.01); *H04L 63/20* (2013.01); *H04L 67/10* (2013.01); *H04L 67/1002* (2013.01); *G06F 2009/4557* (2013.01); *G06F 2009/45562* (2013.01); *G06F 2009/45595* (2013.01)

(56) References Cited

U.S. PATENT DOCUMENTS

| | | | |
|---|---|---|---|
| 9,152,803 | B2 | 10/2015 | Biswas et al. |
| 9,225,638 | B2 | 12/2015 | Jain et al. |
| 9,258,312 | B1 | 2/2016 | O'Neill et al. |
| 9,531,590 | B2 | 12/2016 | Jain et al. |
| 9,594,546 | B1 | 3/2017 | Todd et al. |
| 9,674,275 | B1 | 6/2017 | Engers et al. |
| 9,755,898 | B2 | 9/2017 | Jain et al. |
| 9,774,537 | B2 | 9/2017 | Jain et al. |
| 9,825,810 | B2 | 11/2017 | Jain et al. |
| 9,935,827 | B2 | 4/2018 | Jain et al. |
| 9,979,641 | B2 | 5/2018 | Jain et al. |
| 10,122,735 | B1* | 11/2018 | Wohlgemuth ...... H04L 63/1408 |
| 10,129,077 | B2 | 11/2018 | Jain et al. |
| 10,135,737 | B2 | 11/2018 | Jain et al. |
| 10,193,977 | B2 | 1/2019 | Ke et al. |
| 10,205,701 | B1 | 2/2019 | Voss et al. |
| 10,225,137 | B2 | 3/2019 | Jain et al. |
| 10,257,095 | B2 | 4/2019 | Jain et al. |
| 10,270,796 | B1 | 4/2019 | Veeraswamy et al. |
| 10,320,679 | B2 | 6/2019 | Jain et al. |
| 10,341,233 | B2 | 7/2019 | Jain et al. |
| 10,496,605 | B2 | 12/2019 | Melnik et al. |
| 10,516,568 | B2 | 12/2019 | Jain et al. |
| 10,594,743 | B2 | 3/2020 | Hong et al. |
| 10,609,091 | B2 | 3/2020 | Hong et al. |
| 10,613,888 | B1 | 4/2020 | Mentz et al. |
| 10,628,144 | B2 | 4/2020 | Myneni et al. |
| 10,693,782 | B2 | 6/2020 | Jain et al. |
| 10,708,368 | B1 | 7/2020 | Young et al. |
| 10,725,836 | B2 | 7/2020 | Savenkov et al. |
| 10,795,909 | B1 | 10/2020 | Bond et al. |
| 10,812,337 | B2 | 10/2020 | Vaidya et al. |
| 10,942,788 | B2 | 3/2021 | Palavalli et al. |
| 10,944,691 | B1 | 3/2021 | Raut et al. |
| 10,951,661 | B1 | 3/2021 | Medan et al. |
| 10,972,386 | B2 | 4/2021 | Mackie et al. |
| 11,074,091 | B1 | 7/2021 | Nayakbomman et al. |
| 11,086,700 | B2 | 8/2021 | Myneni et al. |
| 11,159,366 | B1 | 10/2021 | Gawade et al. |
| 2004/0098154 | A1 | 5/2004 | McCarthy |
| 2010/0293378 | A1 | 11/2010 | Xiao et al. |
| 2012/0150912 | A1 | 6/2012 | Ripberger |
| 2012/0304275 | A1 | 11/2012 | Ji et al. |
| 2013/0018994 | A1 | 1/2013 | Flavel et al. |
| 2013/0019314 | A1 | 1/2013 | Ji et al. |
| 2013/0174168 | A1 | 7/2013 | Abuelsaad et al. |
| 2013/0283339 | A1 | 10/2013 | Biswas et al. |
| 2014/0129690 | A1 | 5/2014 | Jaisinghani et al. |
| 2014/0164897 | A1 | 6/2014 | Yucel et al. |
| 2014/0258479 | A1 | 9/2014 | Tenginakai et al. |
| 2015/0063166 | A1 | 3/2015 | Sif et al. |
| 2015/0249574 | A1 | 9/2015 | Zhang |
| 2015/0317169 | A1 | 11/2015 | Sinha et al. |
| 2015/0348044 | A1 | 12/2015 | Smith |
| 2015/0379281 | A1 | 12/2015 | Feroz et al. |
| 2016/0036860 | A1 | 2/2016 | Xing et al. |
| 2016/0080422 | A1 | 3/2016 | Belgodere et al. |
| 2016/0094454 | A1 | 3/2016 | Jain et al. |
| 2016/0094457 | A1 | 3/2016 | Jain et al. |
| 2016/0094661 | A1 | 3/2016 | Jain et al. |
| 2016/0217301 | A1 | 7/2016 | Watanabe et al. |
| 2016/0337334 | A1 | 11/2016 | Murr |
| 2017/0005986 | A1 | 1/2017 | Bansal et al. |
| 2017/0031956 | A1 | 2/2017 | Burk et al. |
| 2017/0063782 | A1 | 3/2017 | Jain et al. |
| 2017/0085561 | A1 | 3/2017 | Han et al. |
| 2017/0171144 | A1 | 6/2017 | Sagiraju et al. |
| 2017/0206034 | A1 | 7/2017 | Fetik |
| 2017/0317954 | A1 | 11/2017 | Masurekar et al. |
| 2017/0332307 | A1 | 11/2017 | Pan |
| 2017/0366416 | A1 | 12/2017 | Beecham et al. |
| 2017/0374106 | A1 | 12/2017 | Hamou et al. |
| 2018/0063194 | A1 | 3/2018 | Vaidya et al. |
| 2018/0083835 | A1 | 3/2018 | Cole et al. |
| 2018/0089299 | A1 | 3/2018 | Collins et al. |
| 2018/0131675 | A1 | 5/2018 | Sengupta et al. |
| 2018/0167487 | A1 | 6/2018 | Vyas et al. |
| 2018/0183757 | A1 | 6/2018 | Gunda et al. |
| 2018/0205605 | A1 | 7/2018 | Mittal et al. |
| 2018/0295036 | A1 | 10/2018 | Krishnamurthy et al. |
| 2018/0331885 | A1 | 11/2018 | Raymond et al. |
| 2018/0359323 | A1 | 12/2018 | Madden |
| 2019/0042518 | A1 | 2/2019 | Marolia et al. |
| 2019/0079751 | A1 | 3/2019 | Foskett et al. |
| 2019/0102280 | A1 | 4/2019 | Caldato et al. |
| 2019/0132220 | A1 | 5/2019 | Boutros et al. |
| 2019/0132221 | A1 | 5/2019 | Boutros et al. |
| 2019/0140895 | A1 | 5/2019 | Ennis, Jr. et al. |
| 2019/0149512 | A1 | 5/2019 | Sevinc et al. |
| 2019/0149516 | A1 | 5/2019 | Rajahalme et al. |
| 2019/0149518 | A1 | 5/2019 | Sevinc et al. |
| 2019/0171650 | A1 | 6/2019 | Botev et al. |
| 2019/0229987 | A1 | 7/2019 | Shelke et al. |
| 2019/0238363 | A1 | 8/2019 | Boutros et al. |
| 2019/0238364 | A1 | 8/2019 | Boutros et al. |
| 2019/0273683 | A1 | 9/2019 | Jiang et al. |
| 2019/0288947 | A1 | 9/2019 | Jain et al. |
| 2019/0306036 | A1 | 10/2019 | Boutros et al. |
| 2019/0306086 | A1 | 10/2019 | Boutros et al. |
| 2019/0384645 | A1 | 12/2019 | Palavalli et al. |
| 2019/0386877 | A1 | 12/2019 | Vaidya et al. |
| 2020/0065080 | A1 | 2/2020 | Myneni et al. |
| 2020/0065166 | A1 | 2/2020 | Myneni et al. |
| 2020/0073692 | A1 | 3/2020 | Rao et al. |
| 2020/0076684 | A1* | 3/2020 | Naveen ............... H04L 41/0806 |
| 2020/0076685 | A1 | 3/2020 | Vaidya et al. |
| 2020/0076734 | A1 | 3/2020 | Naveen et al. |
| 2020/0092275 | A1 | 3/2020 | Seed et al. |
| 2020/0213366 | A1 | 7/2020 | Hong et al. |
| 2020/0250009 | A1 | 8/2020 | Jaeger et al. |
| 2020/0314006 | A1 | 10/2020 | Mackie et al. |
| 2020/0344120 | A1 | 10/2020 | Pianigiani et al. |
| 2020/0366558 | A1 | 11/2020 | Vaidya et al. |
| 2020/0382556 | A1* | 12/2020 | Woolward .......... G06F 16/9024 |
| 2020/0401457 | A1 | 12/2020 | Singhal et al. |

(56) References Cited

U.S. PATENT DOCUMENTS

| | | |
|---|---|---|
| 2020/0409671 A1 | 12/2020 | Mazurskiy |
| 2021/0165695 A1 | 6/2021 | Palavalli et al. |
| 2021/0200814 A1 | 7/2021 | Tai et al. |
| 2021/0243164 A1 | 8/2021 | Murray et al. |
| 2021/0311803 A1 | 10/2021 | Zhou et al. |
| 2021/0314190 A1 | 10/2021 | Liu et al. |
| 2021/0314239 A1 | 10/2021 | Shen et al. |
| 2021/0314240 A1 | 10/2021 | Liu et al. |
| 2021/0314361 A1 | 10/2021 | Zhou et al. |
| 2021/0314388 A1 | 10/2021 | Zhou et al. |
| 2021/0328858 A1 | 10/2021 | Asveren et al. |
| 2021/0349765 A1 | 11/2021 | Zhou et al. |
| 2021/0365308 A1 | 11/2021 | Myneni et al. |
| 2022/0035651 A1 | 2/2022 | Maurya et al. |
| 2022/0038311 A1 | 2/2022 | Shen et al. |
| 2022/0070250 A1 | 3/2022 | Baid et al. |

FOREIGN PATENT DOCUMENTS

| | | | |
|---|---|---|---|
| CN | 108809722 A | | 11/2018 |
| CN | 110531987 A | | 12/2019 |
| CN | 110611588 A | | 12/2019 |
| CN | 111371627 A | | 7/2020 |
| CN | 111865643 A | | 10/2020 |
| WO | 2011159842 A2 | | 12/2011 |
| WO | 2016160523 A1 | | 10/2016 |
| WO | 2018044352 A1 | | 3/2018 |
| WO | WO 2020/041073 A1 | * | 8/2019 |
| WO | 2019241086 A1 | | 12/2019 |
| WO | 2020041073 A1 | | 2/2020 |
| WO | 2021196080 A1 | | 10/2021 |
| WO | 2022026028 A1 | | 2/2022 |

OTHER PUBLICATIONS

Abhashkumar, Anubhavnidhi et al. "Supporting Diverse Dynamic Intent-based Policies using Janus." Proceedings of the 13th International Conference on emerging Networking EXperiments and Technologies (Year: 2017).*

Non-Published Commonly Owned Related International Patent Application PCT/CN2020/082785 with similar specification, filed Apr. 1, 2020, 94 pages, VMware, Inc.

Non-published Commonly Owned U.S. Appl. No. 17/176,191, filed Feb. 16, 2021, 36 pages, VMware, Inc.

PCT International Search Report and Written Opinion of Commonly Owned International Patent Application PCT/CN2020/082785, dated Dec. 31, 2020, 13 pages, International Searching Authority (CN).

Author Unknown, "E-Security Begins with Sound Security Policies," Jun. 14, 2001, 23 pages, Symantec Corporation.

Darabseh, Ala, et al., "SDDC: A Software Defined Datacenter Experimental Framework," Proceedings of the 2015 3rd International Conference on Future Internet of Things and Cloud, Aug. 24-26, 2015, 6 pages, IEEE Computer Society, Washington, D.C., USA.

Non-published Commonly Owned Related U.S. Appl. No. 16/897,640 with similar specification, filed Jun. 10, 2020, 84 pages, VMware, Inc.

Non-published Commonly Owned Related U.S. Appl. No. 16/897,652 with similar specification, filed Jun. 10, 2020, 84 pages, VMware, Inc.

Non-published Commonly Owned U.S. Appl. No. 16/897,666, filed Jun. 10, 2020, 78 pages, VMware, Inc.

Non-published Commonly Owned U.S. Appl. No. 16/897,680, filed Jun. 10, 2020, 78 pages, VMware, Inc.

Non-published Commonly Owned U.S. Appl. No. 16/897,695, filed Jun. 10, 2020, 77 pages, VMware, Inc.

Non-published Commonly Owned U.S. Appl. No. 16/897,704, filed Jun. 10, 2020, 85 pages, VMware, Inc.

Non-published Commonly Owned U.S. Appl. No. 16/897,715, filed Jun. 10, 2020, 70 pages, VMware, Inc.

Non-published Commonly Owned U.S. Appl. No. 16/945,727, filed Jul. 31, 2020, 41 pages, VMware, Inc.

Rouse, Margaret, "What is SDDC (software-defined data center)?— Definition from WhatIs.com," Mar. 2017, 5 pages, TechTarget.com.

Author Unknown, "Kubernetes Core Concepts for Azure Kubernetes Service (AKS)", Jun. 3, 2019, 6 pages, retrieved from https://docs.microsoft.com/en-us/azure/aks/concepts-clusters-workloads.

Chawla, Harsh, et al., "Building Microservices Applications on Microsoft Azure: Designing, Developing, Deploying, and Monitoring," Month Unknown 2019, 271 pages, Harsh Chawla and Hemant Kathuria, India.

Sayfan, Gigi, "Mastering Kubernetes: Automating container deployment and management," May 2017, 426 pages, Packt Publishing, Birmingham, UK.

Wodicka, Brent, "A Developer's Guide to Container Orchestration, Kubernetes, & AKS," Mar. 19, 2019, 5 pages, AIS, Reston, VA, USA.

Author Unknown, "OpenShift Container Platform 4.6," Mar. 3, 2021, 41 pages, Red Hat, Inc.

Qi, Shixiong, et al., "Assessing Container Network Interface Plugins: Functionality, Performance, and Scalability," IEEE Transactions on Network and Service Management, Mar. 2021, 16 pages, vol. 198, No. 1, IEEE.

* cited by examiner

Virtual Network (Vnet) CRD /605 apiVersion: apiextensions.k8s.io/v1
kind: CustomResourceDefinition
metadata:
  name: virtualnetworks.vmware.com
spec:
  group: vmware.com
  versions:
    - name: v1
      served: true
      storage: true
  scope: Namespaced
  names:
    plural: virtualnetworks
    singular: virtualnetwork
    kind: VirtualNetwork
    shortNames:
    - vnet

Virtual Network API /610 apiVersion: vmware.com/v1
kind: VirtualNetwork
metadata:
  name: guest-cluster-network1
spec:
status:
  conditions:
    - type: ready # Type of condition, 'ready' or 'failure'
      status: true # Status of the condition, one of True, False, Unknown
      reason: ... # Brief reason
      message: ... # Human readable message indicating details
  defaultSNATIP: <snat_ip> # default SNAT for GC

*Figure 6*

VirtualNetworkInterface (VIF) CRD   1000 apiVersion: apiextensions.k8s.io/v1
kind: CustomResourceDefinition
metadata:
  name: virtualnetworkinterfaces.vmware.com
spec:
  group: vmware.com
  versions:
    - name: v1
      served: true
      storage: true
  scope: Namespaced
  names:
    plural: virtualnetworkinterfaces
    singular: virtualnetworkinterface
    kind: VirtualNetworkInterface
    shortNames:
    - vif

VirtualNetworkInterface API   1005 apiVersion: vmware.com/v1
kind: VirtualNetworkInterface
metadata:
  name: node1-eth1
  labels: # Optional, used for vifSelector in EndpointGroup
    component: compute
    environment: production
spec:
  virtualNetwork: guest-cluster-network1 # Optional, SC does not need it
status:
  conditions:
    - type: ready # Type of condition, 'ready' or 'failure'
      status: true # Status of the condition, one of True, False, Unknown
      reason: ... # Brief reason
      message: ... # Human readable message indicating details
  interfaceID: <VIF_ID>
  ipAddresses:
    -ip: <interface_ip>
      gateway: <gateway_ip>
      subnetMask: <subnet_mask>
  macAddress: <interface_mac>
  providerStatus:
    nsxLogicalSwitchID: <LS_ID>

*Figure 10*

Endpoint Group (EPG) CRD   1502

```
apiVersion: apiextensions.k8s.io/v1
kind: CustomResourceDefinition
metadata:
  name: endpointgroups.vmware.com
spec:
  group: vmware.com
  versions:
   - name: v1
     served: true
     storage: true
  scope: Namespaced
  names:
    plural: endpointgroups
    singular: endpointgroup
    kind: EndpointGroup
    shortNames:
    - epg
```

Endpoint Group API   1504

```
apiVersion: vmware.com/v1
kind: EndpointGroup
metadata:
  name: some-group0
spec:
  # Define ports to be used in Kubernetes Service and Endpoints
  ports:
    - {port: 6443, protocol: TCP, name: https}
    - {port: 5353, protocol: UDP, name: dns}
  criteria:
    vifSelector:
      # Select vifs under the VirtualNetwork in the same namespace.
      # If ignored, select VIFs in the SC default VirtualNetwork.
      virtualNetwork: vnet_name
      # The matchLabels and matchExpressions results are ANDed.
      matchLabels:
        # Matches labels on the VIF CRD object.
        labelX: valueX
``` workload controller create a stub Service without selector.   1506

```
apiVersion: v1
kind: Service
metadata:
  name: some-group0 # Same name and
    namespace as the EndpointGroup
  ownerReferences:
    - apiVersion: vmware.com/v1
      controller: true
      kind: EndpointGroup
      name: some-group0
      uid: xxxx...
spec:
  type: ClusterIP
  ports:
    - {port: 6443, protocol: TCP, name: https}
    - {port: 5353, protocol: UDP, name: dns}
``` workload controller maintain the selected VIF members in Endpoints.subsets.   1508

```
apiVersion: v1
kind: Endpoints
metadata:
  name: some-group0 # Same name name namespace as the Service
subsets:
- addresses:
    - ip: 172.10.0.2 # node VM IP on the VIF
      targetRef:
        apiVersion: vmware.com/v1
        kind: VirtualNetworkInterface
        name: k8s-apiserver-0 # Name of the VIF
        namespace: someNS
    - ip: 172.10.0.3
      targetRef:
        apiVersion: vmware.com/v1
        kind: VirtualNetworkInterface
        name: k8s-apiserver-1 # Name of the VIF
        namespace: someNS
  ports:
    - {port: 6443, protocol: TCP, name: https}
    - {port: 5353, protocol: UDP, name: dns}
```

*Figure 15*

Virtual Service Object (VSO) CRD

```
apiVersion: apiextensions.k8s.io/v1
kind: CustomResourceDefinition
metadata:
  name: virtualserviceobject.vmware.com
spec:
  group: vmware.com
  versions:
    - name: v1
      served: true
      storage: true
  scope: Namespaced
  names:
    plural: virtualserviceobjects
    singular: virtualserviceobject
    kind: VirtualServiceObject
    shortNames:
    - vso
  subresources:
    status: {}
```

*Figure 18*

Virtual Service Object (VSO) API

```
apiVersion: vmware.com/v1
kind: VirtualServiceObject                                              1900
metadata:
  name: vso0
spec:
  # If externalScope is defined, an external VIP is allocated, and the ports are exposed on the VIP.
  # If externalScope={loadbalancer: nameLB1}, VIP attaches to a specific LB.
  # If externalScope={}, VIP attaches to the default SC LB.
  externalScope:
    loadbalancer: lb-1 # Once defined, target loadbalancer name will no change
  L4Routes:
    - match: # ...
      destination: # ...
    # Support both TCP and UDP
    - match: {port: 8080, protocol: TCP}
      name: serviceX
      destination:
        # A Kubernetes ObjectReference to a Service https://kubernetes.io/docs/reference/generated/kubernetes-api/
        v1.15/#objectreference-v1-core
        targetRef:
          apiVersion: v1
          kind: Service
          name: svcX # Once defined, name will not change.
          namespace: someNS # If omitted, point to Service in the same namespace.
          # resourceVersion is ignored, use the latest resource.
          # uid is omitable, if provided, find the Service according to the uid, not the name.
        port: 80 # Port number, or port name in the Kubernetes service
    - match: {port: 5353, protocol: UDP}
      name: serviceY
      destination:
        targetRef:
          apiVersion: vmware.com/v1
          kind: EndpointGroup
          name: EPA
          namespace: someNS
          # resourceVersion is ignored, use the latest resource.
          # uid is omitable, if provided, find the EndpointGroup according to the uid, not the name.
        port: 53 # Port number, or port name in EndpointGroup.spec.ports
    - match: {port: 80,443,8000-10000, protocol: TCP}
      # allow multiple port ranges, so as to support 3rd-party LB inside GC
      name: serviceZ
      destination:
        targetRef:
          apiVersion: vmware.com/v1
          kind: EndpointGroup
          name: epgB # The namespace is omitted, it points to EndpointGroup in the same namespace.
        # Port should be omitted if mapping multiple ports or port ranges
        # NSX LB uses LB dest port used by the client as target port
```

*Figure 19*

Load Balancer CRD apiVersion: apiextensions.k8s.io/v1
kind: CustomResourceDefinition
metadata:
  name: loadbalancers.vmware.com
spec:
  group: vmware.com
  versions:
    - name: v1
      served: true
      storage: true
  scope: Namespaced
  names:
    plural: loadbalancers
    singular: loadbalancer
    kind: LoadBalancer

*Figure 20*

Load Balancer API apiVersion: vmware.com/v1
kind: LoadBalancer
metadata:
  name: cluster1-lbs0                  # display name of the loadBalancer
spec:
  httpConfig:       # optional config to support http/https route on the loadBalancer. Set {} to apply default settings
    virtualIP:                       # optional, defaults to auto_allocate
    port: 81                        # optional, defaults to 80
    tls:                             # optional, defaults to an empty dictionary.
      port: 9998                   # optional, defaults to 443
      secretName: default_secret    # optional, defaults to nil
      xForwardedFor: INSERT         # optional, available values are INSERT, REPLACE, defaults to nil affinity:
      type: source_ip               # optional, available values are source_ip, cookie
      timeout: 100                # optional, defaults to 10800
    size: MEDIUM                  # optional, defaults to SMALL
    virtualNetworkName: virtualnetwork1  # optional, defaults to nil
status:
    httpVirtualIP: <realized external ip>  # auto-allocated or user desired external ip for http/https virtual server

*Figure 21*

Security Policy API

```
apiVersion: vmware.com/v1
kind: SecurityPolicy
metadata:
  name: policy-1
spec:
  appliedToGroup: epp-2
  ingress:
  - from:
    sourceGroup: src-epp
    ports:
    - protocol: TCP
    - port: 80
  egress:
  - to:
    destinationGroup: dst-epp
    ports:
    - protocol: TCP
    - port: 80
```

*Figure 22*

Security Policy CRD

```
apiVersion: apiextensions.k8s.io/v1
kind: CustomResourceDefinition
metadata:
  name: securitypolicies.vmware.com
spec:
  group: vmware.com
  versions:
    - name: v1
      served: true
      storage: true
  scope: Cluster
  names:
    plural: securitypolicies
    singular: securitypolicy
    kind: SecurityPolicy
    shortNames:
    -   sp
```

*Figure 23*

Admin Policy CRD

```
apiVersion: apiextensions.k8s.io/v1
kind: CustomResourceDefinition
metadata:
  name: adminpolicies.vmware.com
spec:
  group: vmware.com
  versions:
    - name: v1
      served: true
      storage: true
  scope: Namespaced
  names:
    plural: adminpolicies
    singular: adminpolicy
    kind: AdminPolicy
    shortNames:
    -   ap
```

*Figure 25*

Admin Policy API

```
apiVersion: vmware.com/v1
kind: AdminPolicy
metadata:
  name: admin-policy-1
spec:
  appliedTo: vvpc-1
  ingress:
  - from:
    ip-block: 172.168.0.1/24
    action: ALLOW
  egress:
  - to:
    namespace: vvpc-2
    action: DENY
```

*Figure 26*

ADMINISTRATIVE POLICY CUSTOM RESOURCE DEFINITIONS

BACKGROUND

With the recent increase in cloud native applications, today there is more demand than ever for fast deployment of on-demand networking for connecting machines that are deployed in software defined datacenters (SDDC). It is desirable to provide auto-deployed networking solutions as many compute-cluster administrators do not have extensive knowledge of networking. However, for administrators who wish to adjust their system's networking, it is desirable to provide such administrators with the ability to configure and customize their network deployments.

SUMMARY

Some embodiments of the invention provide a method for deploying network elements for a set of machines in a set of one or more software defined datacenters (SDDCs). The datacenter set is part of one availability zone in some embodiments. The method receives intent-based API (Application Programming Interface) requests, and parses these API requests to identify a set of network elements to connect and/or to perform services for the set of machines. In some embodiments, the API is a hierarchical document that can specify multiple different compute and/or network elements at different levels of compute and/or network element hierarchy.

The method performs automated processes to define a virtual private cloud (VPC) to connect the set of machines to a logical network that segregates the set of machines from other machines in the datacenter set. In some embodiments, the set of machines include virtual machines and container Pods, the VPC is defined with a supervisor cluster namespace, and the API requests are provided as YAML files.

The automated processes in some embodiments use templates or preconfigured rules to identify and deploy the network elements that implement the logical network without an administrator performing any action to direct the identification and deployment of the network elements after an API request is received. In some embodiments, the deployed network elements include a gateway router for the VPC (called VPC gateway router) to connect the VPC to a network of the datacenter set or to a network external to the datacenter set.

This gateway router in some embodiments is implemented by one physical router. In other embodiments, the VPC gateway router is a logical gateway router that is implemented by more than one physical router. For instance, in some embodiments, the logical router is implemented with two physical routers in active/active or active/standby configurations. Also, in some embodiments, the logical router includes (1) a distributed router that is implemented by several router instances on host computers and edge appliances, and (2) one or more central routers that are each implemented by an edge appliance.

The VPC gateway router is configured to communicate with a datacenter gateway router to connect the VPC gateway to another VPC gateway of another VPC in order to connect the two VPCs to each other. In some embodiments, the VPC routers of the two VPCs can be configured to communicate with each other directly. In some embodiments, the VPC gateway router is configured to perform source network address translation (SNAT) operation to translate internal network addresses used within the VPC to a set of one or more external source network addresses. The external source network addresses in some embodiments are addresses within the datacenter set, while in other embodiments, the external source network addresses are addresses to a network outside of the datacenter set. In some embodiments, the VPC gateway router does not perform SNAT operations for traffic exchanged between the VPC and another VPC that is deployed in the set of datacenters, while in other embodiments it performs such SNAT operations.

The VPC gateway is configured to perform load balancing operations, or to work with one or more load balancers to perform load balancing operations, on ingress and/or egress traffic entering and/or exiting the VPC. The load balancing operations in some embodiments are Layer 4 (L4) and/or Layer 7 (L7) load balancing operations. In some embodiments, at least a subset of the deployed machines is deployed through Kubernetes, and the L4/L7 load balancing operations implement the load balancing and ingress services of Kubernetes.

To deploy the network elements, the method of some embodiments uses one or more Custom Resource Definitions (CRDs) to define attributes of custom-specified network resources that are referred to by the received API requests. When these API requests are Kubernetes APIs, the CRDs define extensions to the Kubernetes networking requirements. In addition to the Kubernetes-based container Pods, the method of some embodiments deploys network elements to connect non-Kubernetes Pods and/or virtual machines (VMs). For the non-Kubernetes Pods and for VMs, the method of some embodiments uses virtual network interfaces (VIF) CRDs to specify virtual interfaces for connecting the non-Kubernetes Pods and the VMs to software forwarding elements (e.g., software switches) executing on host computers on which the non-Kubernetes Pods and VMs execute.

The method of some embodiments configures the logical network for the VPC to connect the deployed set of machines to each other. For instance, in some embodiments, the logical network includes one or more logical forwarding elements, such as logical switches, routers, gateways, etc. In some embodiments, the method defines a logical forwarding element (LFE) by configuring several physical forwarding elements (PFEs), some or all of which execute on host computers along with the deployed machines (e.g., VMs and Pods). The method in some embodiments configures the PFEs to implement two or more LFEs to connect two or more different subsets of deployed machines.

In some embodiments, the method configures the logical network by configuring two or more sub-networks for the logical networks. In some embodiments, each sub-network has one or more segments (with each segment implemented by a logical switch), connects a different subset of deployed machines, and provides a set of network elements that satisfy a unique set of connectivity requirements for that subset of machines. For instance, in some embodiments, a first sub-network (e.g., a first logical switch) connects the Kubernetes Pods, while a second sub-network (e.g., a second logical switch) connects VMs and/or non-Kubernetes Pods. Another example is having one sub-network for machines (e.g., VMs, Pods, etc.) that need high-bandwidth, and another sub-network for machines that can tolerate less bandwidth.

To deploy some or all of the unique sub-networks, the method of some embodiments uses CRDs to define the attributes of the sub-networks, so that these sub-networks can be referred to by the API requests processed by the method. These CRDs are referred to below as virtual network CRDs. An API that refers to a virtual-network CRD in some embodiments includes a network type value that can be used to define different types of virtual networks.

Some embodiments have the following four network types (1) a default type comprising one or more network segments for the logical sub-network with each network segment connecting to the VPC gateway router, (2) a public type comprising one or more network segments connecting to a separate gateway router for the logical sub-network that connects to the VPC gateway router and supports separate routing table and services for the logical network, (3) a high-bandwidth type comprising one or more segments that connect to a separate gateway router to directly connect to a router of the datacenter set, and (4) a private type comprising one or more segments for the logical sub-network that are isolated inside the VPC.

As mentioned above, the method of some embodiments uses VIF CRDs to define and deploy VIFs for non-Kubernetes Pods and for VMs. The VPC in some embodiments operates within a single routing domain that has an associated IP CIDR (Classless Inter-Domain Routing). For a VIF that belongs to a network segment, the method in some embodiments automatically allocates an IP address from an IP subnet of the VPC IP CIDR that is automatically allocated for the segment, unless the IP addresses from the currently allocated IP subnet are all used, in which case it automatically allocates a new IP subnet from the VPC IP CIDR and automatically allocates an IP address from the newly allocated IP subnet.

In some embodiments, the PFE ports to which the VIFs connects (i.e., with which the VIFs are associated) are configured with one or more hooks, i.e., with one or more functional calls, to one or more service engines that perform service operations on data messages (e.g., packets) passing through the ports. One such service engine in some embodiments is a load balancer that distributes the data traffic load among several sets of endpoint machines that are associated with a network address or a set of network addresses (e.g., a VIP address, or a set of associated IP addresses).

This load balancer distributes the data messages sent from a VIF's associated VM or Pod among the machines in the set of endpoint machines. Also, in some embodiments, this load balancer implements a distributed load balancer (i.e., a logical load balancer) with several other load balancers operating on several different host computers. This distributed load balancer in some embodiments implements one or more ClusterIP services that are specified by the Kubernetes API calls.

Some embodiments utilize an Endpoint Group CRD to define groupings of homogeneous or heterogenous sets of machines as one or more endpoint groups. In some embodiments, members of an endpoint group are specified by one or more selectors, which use different types of network constructs to identify the members of an endpoint group. The selectors in some embodiments include VIF selectors, Pod selectors, Namespace selectors, and Service selectors. Some embodiments use the endpoint group and VIF CRDs to define an endpoint group of the same- or different-type machines to provide a ClusterIP service that is specified by the Kubernetes API calls.

Some embodiments utilize security CRDs to define additional ways to specify security policies for the VPC. For instance, the method of some embodiments uses Security Policy CRD to define firewall rules that control traffic between VPC network endpoints, which can be defined by APIs referencing Endpoint Group CRDs. The endpoint groups in some embodiments can be specified as either source or destination for ingress or egress security rules (e.g., firewall rules). Such rules are enforced with firewall engines that have hooks defined in the ports connecting to the interfaces (e.g., VIFs) of VMs and container Pods.

In some embodiments, selectors (such as VIF selectors, Pod selectors, Service selectors, etc.) can be used to specify an AppliedTo field in an API to specify where a security policy defined through the Security Policy CRD should be enforced. Endpoint groups in some embodiments can also be used to specify locations for applying the security policies that are defined through a Security Policy CRD. The Security Policy CRD provides the convenience of dynamic grouping, since existing solutions require manually association of an endpoint instance to a security group. Security Policy CRDs in some embodiments also support membership across different virtual networks (defined though Virtual Network CRDs) and across different VPCs. Hence, administrators in some embodiments can use Security Policy CRDs to define ingress/egress rules for traffic between two VPCs.

Some embodiments use Admin Policy CRDs to define another type of security policies. These CRDs in some embodiments allow higher priority security policies (e.g., higher priority than the security policies defined through Security Policy CRDs) to be defined for the entire VPC. In some embodiments, Admin Policy CRDs control the north/south traffic between the VPC and an external network (e.g., from another VPC, from an external IP block, or from outside of the datacenter set in which the VPC is deployed). When a sub-network of a logical network has its own gateway, some embodiments use Admin Policy CRDs to define security policies for the gateway to enforce.

In some embodiments, the policies defined through the Admin Policy CRD are implemented through firewall rules that are enforced by the VPC gateway, or one or more firewalls used by the VPC gateway. This is in contrast in some embodiments to the security policies that are defined through the Security Policy CRDs, which are enforced by distributed firewalls executing on the host computers with the source or destination VMs and Pods.

Some embodiments use a virtual service object (VSO) CRD to expose a service (e.g., a middlebox service or an application tier, such as Webserver, AppServer, database server) provided inside of the VPC to machines outside of the VPC or to machines inside of the VPC. In some embodiments, a VSO API based on the VSO CRD maps a set of one or more L4 ports and a protocol to an endpoint group of machines for providing the service. The VSO API in some embodiments also specifies an internal scope and/or external scope for the virtual service, with the internal scope specifying that the virtual service is available to machines inside of the VPC, while the external scope specifies that the virtual service is available to machines outside of the VPC.

In some embodiments, the method automatically allocates an internal VIP address for the virtual service when the internal scope is specified, while automatically allocating an external VIP address for the virtual service when the external scope is scope. The method also automatically generates one or more load balancing rules for one or more load balancers to implement the virtual service. Each load balancing rule includes (1) a match criteria set that comprises the VIP, the port set, and protocol and (2) an action criteria set that comprises a set of one or more identifiers that identify machines in the endpoint group specified for the virtual service deployed with the VSO CRD.

For the external scope, the load balancing rules in some embodiments are implemented by the VPC gateway router, or a set of load balancers used by the VPC gateway router. For the internal scope, the load balancing rules in some embodiments are implemented by the VPC gateway route or a set of load balancers used by the VPC gateway router, and/or by a distributed load balancer implemented by load balancing engines executing on host computers along with the client VMs and Pods that use the virtual service. In some embodiments, the VSO API specifies one or more different types of load balancers for performing load balancing operations with respect to the virtual service for one or more different types of data message traffic. In some embodiments that use Kubernetes APIs, the VSO API can be used to define ClusterIP and Load Balancer service types as the designated load balancing type(s).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings and the Claims is needed. Moreover, the claimed subject matters are not to be limited by the illustrative details in the Summary, the Detailed Description and the Drawing.

BRIEF DESCRIPTION OF FIGURES

The novel features of the invention are set forth in the appended claims. However, for purposes of explanation, several embodiments of the invention are set forth in the following figures.

FIG. 6 illustrates an example of the virtual network CRD and an intent-based API for creating a virtual network based on this CRD for a guest cluster.

FIG. 10 illustrates an example VIF CRD and an API that refers to this CRD.

FIG. 15 illustrates examples of an Endpoint Group CRD and several APIs related to this CRD.

FIGS. 18 and 19 illustrate examples of a VSO CRD and a VSO API.

FIGS. 20 and 21 illustrates an example of a Load Balancer CRD and an API that refers to this CRD.

FIG. 22 illustrates an example of an API that uses a Security Policy CRD.

FIG. 23 illustrates an example of a Security Policy CRD.

FIGS. 25 and 26 illustrates an example of an Admin Policy CRD and an API that uses an Admin Policy CRD.

DETAILED DESCRIPTION

Figure 1:
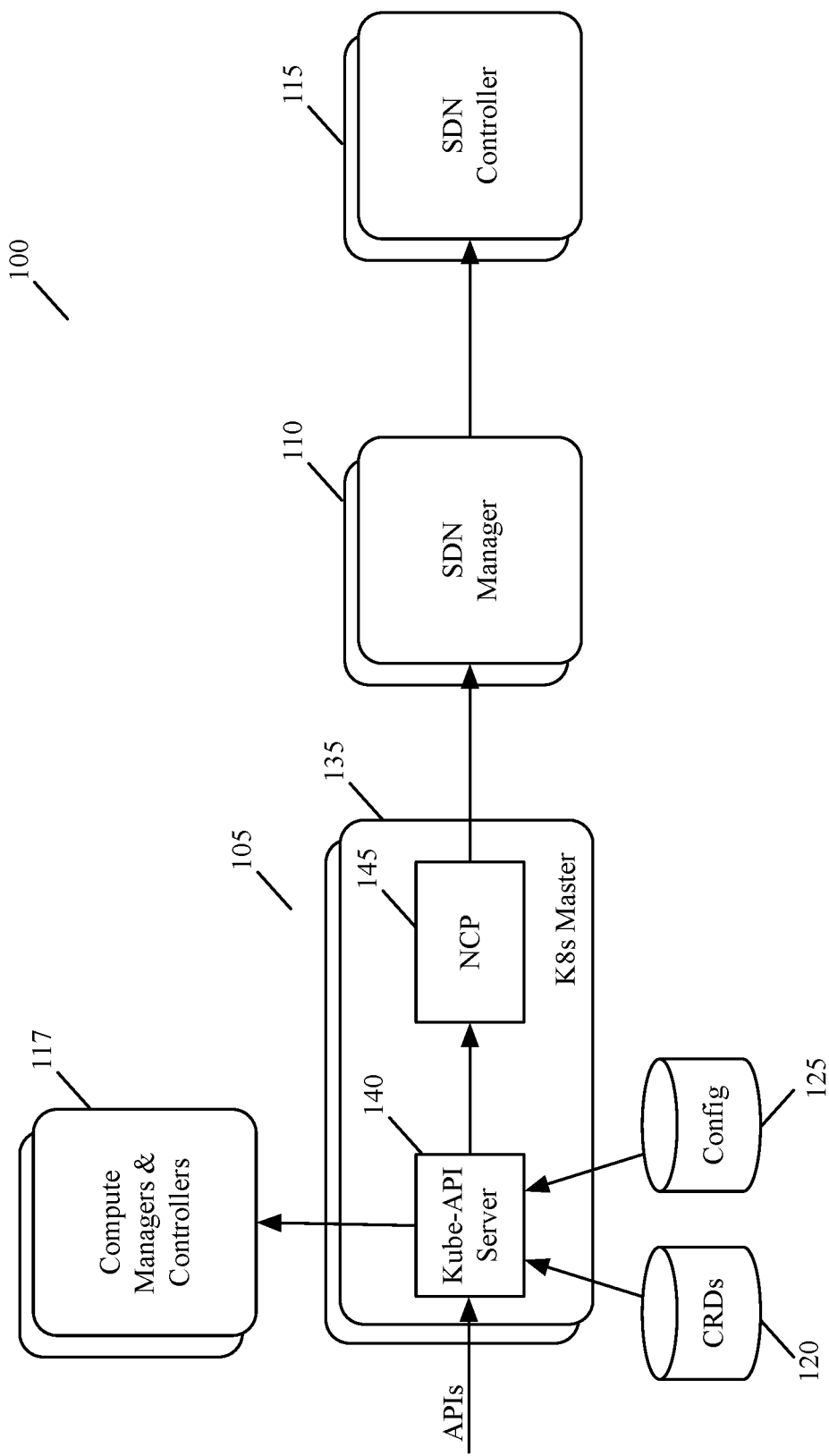
FIG. 1 illustrates a network control system of some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network control system for deploying and managing network elements for a set of related machines in a set of one or more software defined datacenters (SDDCs). The datacenter set is part of one availability zone in some embodiments. The network control system receives intent-based API (Application Programming Interface) requests, and parses these API requests (API calls) to identify network elements to deploy for the set of machines. In some embodiments, the API is a hierarchical document that can specify multiple different compute and/or network elements at different levels of compute and/or network element hierarchy.

The network control system performs automated processes to define a virtual private cloud (VPC) to connect the set of machines to a logical network that segregates these machines from other machines in the datacenter set. In some embodiments, the set of machines include virtual machines (VMs) and container Pods, the VPC is defined with a supervisor cluster namespace, and the API requests are provided as YAML files.

To deploy the network elements, the network control system of some embodiments processes one or more Custom Resource Definitions (CRDs) that define attributes of custom-specified network resources that are referred to by the received API requests. When these API requests are Kubernetes API requests, the CRDs define extensions to the Kubernetes networking requirements. Some embodiments use the following CRDs: Virtual Network Interfaces (VIF)

CRDs, Virtual Network CRDs, Endpoint Group CRDs, security CRDs, Virtual Service Object (VSO) CRDs, and Load Balancer CRD.

A VIF CRD in some embodiments is used to define a virtual interface to connect a non-Kubernetes container Pod or VM to software forwarding elements (e.g., software switches) executing on host computers on which the non-Kubernetes Pods and VMs execute. A Virtual Network CRD in some embodiments is used to define the attributes of a logical sub-network that is to connect a subset of the deployed machines. An Endpoint Group CRD is used to define attributes for grouping heterogeneous or homogeneous sets of machines (i.e., machines of the same or different types). Endpoint Group CRD provides a simple mechanism for defining a group of machines for accessing a service or compute operation, and/or for providing a service or compute operation.

Security CRDs are used to specify security policies for the VPC. For instance, some embodiments use Security Policy CRD to define security policies for traffic between VPC network endpoints, which can be defined with Endpoint Group CRDs. Another security CRD in some embodiments is an Admin Policy CRD, which can be used to define security policies for north/south traffic between the VPC and an external network (e.g., from another VPC, from an external IP block, or from outside of the datacenter set in which the VPC is deployed).

A VSO CRD is used to expose a service (e.g., a middlebox service or an application tier, such as Webserver, AppServer, database server) provided inside of the VPC to machines outside of the VPC or to machines inside of the VPC. In some embodiments, an API that refers to a VSO CRD map a set of one or more L4 ports and a protocol to an endpoint group of machines for providing the service. Some embodiments use a Load Balancer CRD to define the configuration for a load balancer service. In some embodiments, the API that refers to the VSO CRD also uses the Load Balancer CRD to specify a load balancer service to use for distributing the traffic load among the endpoint group of machines.

Several more detailed examples of some embodiments will now be described. In these examples, several of the deployed logical networks are Kubernetes-based logical networks that define virtual private clouds (VPC) for corporate entities in one or more datacenters. In some embodiments, the VPC is a "supervisor" Kubernetes cluster with a namespace that provides the tenancy boundary for the entity. These embodiments use CRDs to define additional networking constructs and policies that complement the Kubernetes native resources.

One of ordinary skill will realize that other embodiments define other types of networks for other types of entities, such as other business entities, non-profit organizations, educational entities, etc. In some of these other embodiments, neither Kubernetes nor Kubernetes-based Pods are used. For instance, some embodiments are used to deploy networks for only VMs and/or non-Kubernetes containers/Pods.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

FIG. 1 illustrates an example of a control system 100 of some embodiments of the invention. This system 100 processes APIs that use the Kubernetes-based declarative model to describe the desired state of (1) the machines to deploy, and (2) the connectivity, security and service operations that are to be performed for the deployed machines (e.g., private and public IP addresses connectivity, load balancing, security policies, etc.). To process these API, the control system 100 uses one or more CRDs to define some of the resources referenced in the APIs. The system 100 performs automated processes to deploy a logical network that connects the deployed machines and segregates these machines from other machines in the datacenter set. The machines are connected to the deployed logical network of a VPC in some embodiments.

As shown, the control system 100 includes an API processing cluster 105, a software defined network (SDN) manager cluster 110, an SDN controller cluster 115, and compute managers and controllers 117. The API processing cluster 105 includes two or more API processing nodes 135, with each node comprising an API processing server 140 and a network controller plugin (NCP) 145. The API processing server receives intent-based API calls and parses these calls. In some embodiments, the received API calls are in a declarative, hierarchical Kubernetes format, and may contain multiple different requests.

The API processing server 140 parses each received intent-based API request into one or more individual requests. When the requests relate to the deployment of machines, the API server provides these requests directly to compute managers and controllers 117, or indirectly provide these requests to the compute managers and controllers 117 through an agent running on the Kubernetes master node 135. The compute managers and controllers 117 then deploy VMs and/or Pods on host computers in the availability zone.

The API calls can also include requests that require network elements to be deployed. In some embodiments, these requests explicitly identify the network elements to deploy, while in other embodiments the requests can also implicitly identify these network elements by requesting the deployment of compute constructs (e.g., compute clusters, containers, etc.) for which network elements have to be defined by default. As further described below, the control system 100 uses the NCP 145 to identify the network elements that need to be deployed, and to direct the deployment of these network elements.

In some embodiments, the API calls refer to extended resources that are not defined per se by Kubernetes. For these references, the API processing server 140 uses one or more CRDs 120 to interpret the references in the API calls to the extended resources. As mentioned above, the CRDs in some embodiments include the VIF, Virtual Network, Endpoint Group, Security Policy, Admin Policy, and Load Balancer and VSO CRDs. In some embodiments, the CRDs are provided to the API processing server in one stream with the API calls.

NCP 145 is the interface between the API server 140 and the SDN manager cluster 110 that manages the network elements that serve as the forwarding elements (e.g., switches, routers, bridges, etc.) and service elements (e.g., firewalls, load balancers, etc.) in an availability zone. The SDN manager cluster 110 directs the SDN controller cluster 115 to configure the network elements to implement the desired forwarding elements and/or service elements (e.g., logical forwarding elements and logical service elements) of one or more logical networks. As further described below, the SDN controller cluster interacts with local controllers on host computers and edge gateways to configure the network elements in some embodiments.

In some embodiments, NCP 145 registers for event notifications with the API server 140, e.g., sets up a long-pull session with the API server to receive all CRUD (Create, Read, Update and Delete) events for various CRDs that are defined for networking. In some embodiments, the API server 140 is a Kubernetes master VM, and the NCP 145 runs in this VM as a Pod. NCP 145 in some embodiments collects realization data from the SDN resources for the CRDs and provide this realization data as it relates to the CRD status.

In some embodiments, NCP 145 processes the parsed API requests relating to VIFs, virtual networks, load balancers, endpoint groups, security policies, and VSOs, to direct the SDN manager cluster 110 to implement (1) the VIFs needed to connect VMs and Pods to forwarding elements on host computers, (2) virtual networks to implement different segments of a logical network of the VPC, (3) load balancers to distribute the traffic load to endpoint machines, (4) firewalls to implement security and admin policies, and (5) exposed ports to access services provided by a set of machines in the VPC to machines outside and inside of the VPC.

The API server provides the CRDs that have been defined for these extended network constructs to the NCP for it to process the APIs that refer to the corresponding network constructs. The API server also provides configuration data from the configuration storage 125 to the NCP 145. The configuration data in some embodiments include parameters that adjust the pre-defined template rules that the NCP follows to perform its automated processes. The NCP performs these automated processes to execute the received API requests in order to direct the SDN manager cluster 110 to deploy the network elements for the VPC. For a received API, the control system 100 performs one or more automated processes to identify and deploy one or more network elements that are used to implement the logical network for a VPC. The control system performs these automated processes without an administrator performing any action to direct the identification and deployment of the network elements after an API request is received.

The SDN managers 110 and controllers 115 can be any SDN managers and controllers available today. In some embodiments, these managers and controllers are the NSX-T managers and controllers licensed by VMware Inc. In such embodiments, NCP 145 detects network events by processing the data supplied by its corresponding API server 140, and uses NSX-T APIs to direct the NSX-T manager 110 to deploy and/or modify NSX-T network constructs needed to implement the network state expressed by the API calls. The communication between the NCP and NST-T manager 110 is asynchronous communication, in which NCP provides the desired state to NSX-T managers, which then relay the desired state to the NSX-T controllers to compute and disseminate the state asynchronously to the host computer, forwarding elements and service nodes in the availability zone (i.e., to the SDDC set controlled by the controllers 115).

Figure 2:
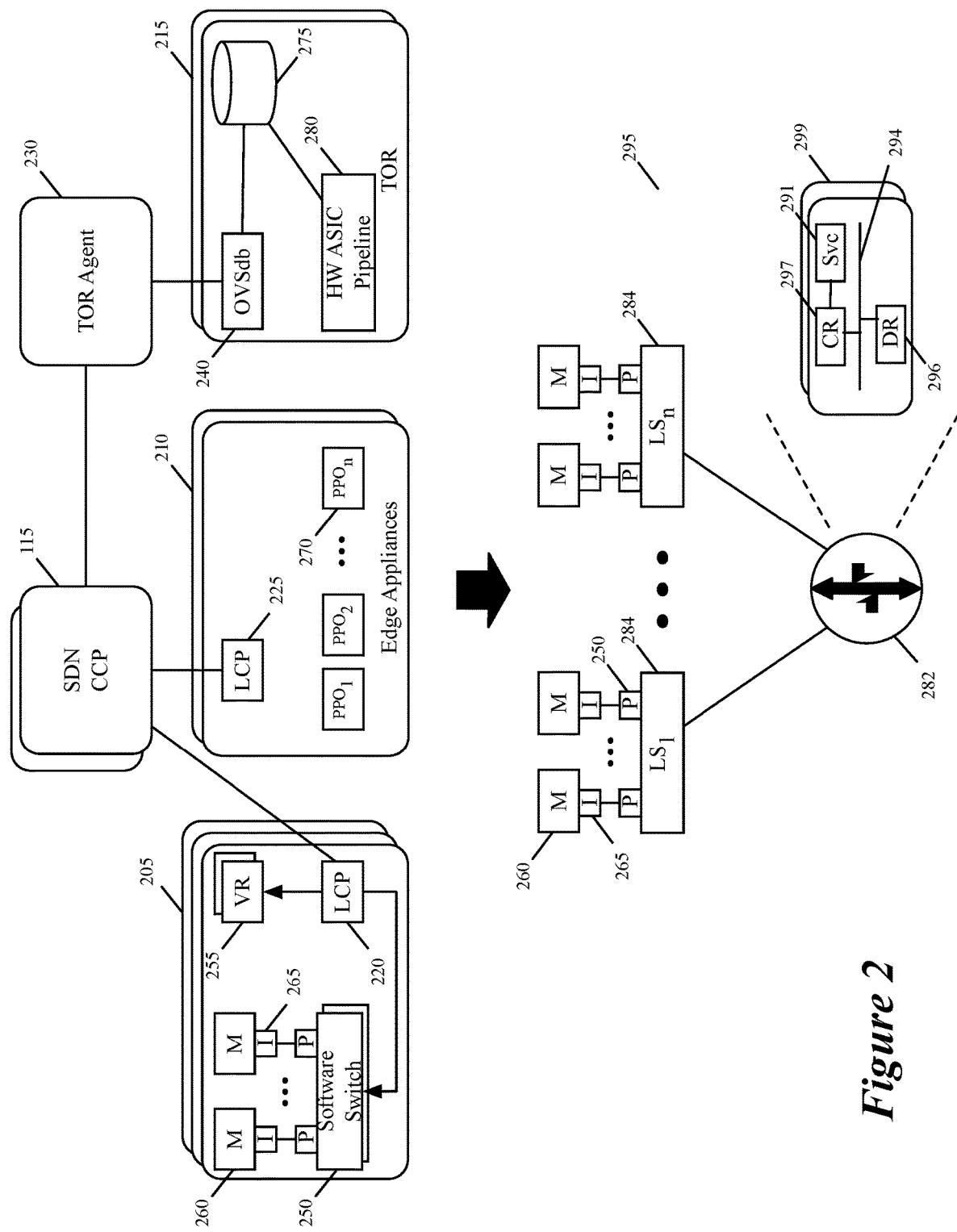
FIG. 2 illustrates an example of a logical network for a virtual private cloud.

After receiving the APIs from the NCPs 145, the SDN managers 110 in some embodiments direct the SDN controllers 115 to configure the network elements to implement the network state expressed by the API calls. In some embodiments, the SDN controllers serve as the central control plane (CCP) of the control system 100. FIG. 2 depicts the SDN controllers 115 acting as the CCP compute high level configuration data (e.g., port configuration, policies, forwarding tables, service tables, etc.). In such capacity, the SDN controllers 115 push the high-level configuration data to the local control plane (LCP) agents 220 on host computers 205, LCP agents 225 on edge appliances 210 and TOR (top-of-rack) agents 230 of TOR switches 215.

Based on the received configuration data, the LCP agents 220 on the host computers 205 configure one or more software switches 250 and software routers 255 to implement distributed logical switches, routers, bridges and/or service nodes (e.g., service VMs or hypervisor service engines) of one or more logical networks with the corresponding switches and routers on other host computers 205, edge appliances 210, and TOR switches 215. On the edge appliances, the LCP agents 225 configure packet processing stages 270 of these appliance to implement the logical switches, routers, bridges and/or service nodes of one or more logical networks along with the corresponding switches and routers on other host computers 205, edge appliances 210, and TOR switches 215.

For the TORs 215, the TOR agents 230 configure one or more configuration tables 275 of TOR switches 215 through an OVSdb server 240. The data in the configuration tables then is used to configure the hardware ASIC packet-processing pipelines 280 to perform the desired forwarding operations to implement the desired logical switching, routing, bridging and service operations. U.S. Pat. Nos. 10,554,484, 10,250,553, 9,847,938, and 9,178,833 describe CCPs, LCPs and TOR agents in more detail, and are incorporated herein by reference.

After the host computers 205 are configured along with the edge appliances 210 and/or TOR switches 215, they can implement one or more logical networks, with each logical network segregating the machines and network traffic of the entity for which it is deployed from the machines and network traffic of other entities in the same availability zone. FIG. 2 illustrates an example of a logical network 295 that define a VPC for one entity, such as one corporation in a multi-tenant public datacenter, or one department of one corporation in a private datacenter.

As shown, the logical network 295 includes multiple logical switches 284 with each logical switch connecting different sets of machines and serving as a different network segment. Each logical switch has a port 252 that connects with (i.e., is associated with) a virtual interface 265 of a machine 260. The machines 265 in some embodiments include VMs and Pods, with each Pod having one or more containers.

The logical network 295 also includes a logical router 282 that connects the different network segments defined by the different logical switches 284. In some embodiments, the logical router 282 serves as a gateway for the deployed VPC in FIG. 2. In some embodiments, the logical router 282 includes distributed routing components 296 and centralize routing components 297. The distributed routing components in some embodiments are implemented by the routing instances that execute on the host computers and edge appliances, while the central routing components 297 are implemented by the edge appliances 210. Each centralized routing component performs one or more services 291 or are associated with one or more middlebox service nodes that perform one or more services. As such, the centralized routing component are referred to as service routers in some embodiments.

In some embodiments, the centralized and distributed routing components connect through a logical switch 294 defined on the host computers 205 and the edge appliances 210. Also, in some embodiments, the logical router is implemented by a pair of logical nodes 299, with each node having centralized and distributed components. The pair of nodes can be configured to perform in active/active or active/standby modes in some embodiments. U.S. Pat. No. 9,787,605 describes the gateway implementation of some embodiments in more detail and are incorporated herein by reference.

Figure 3:
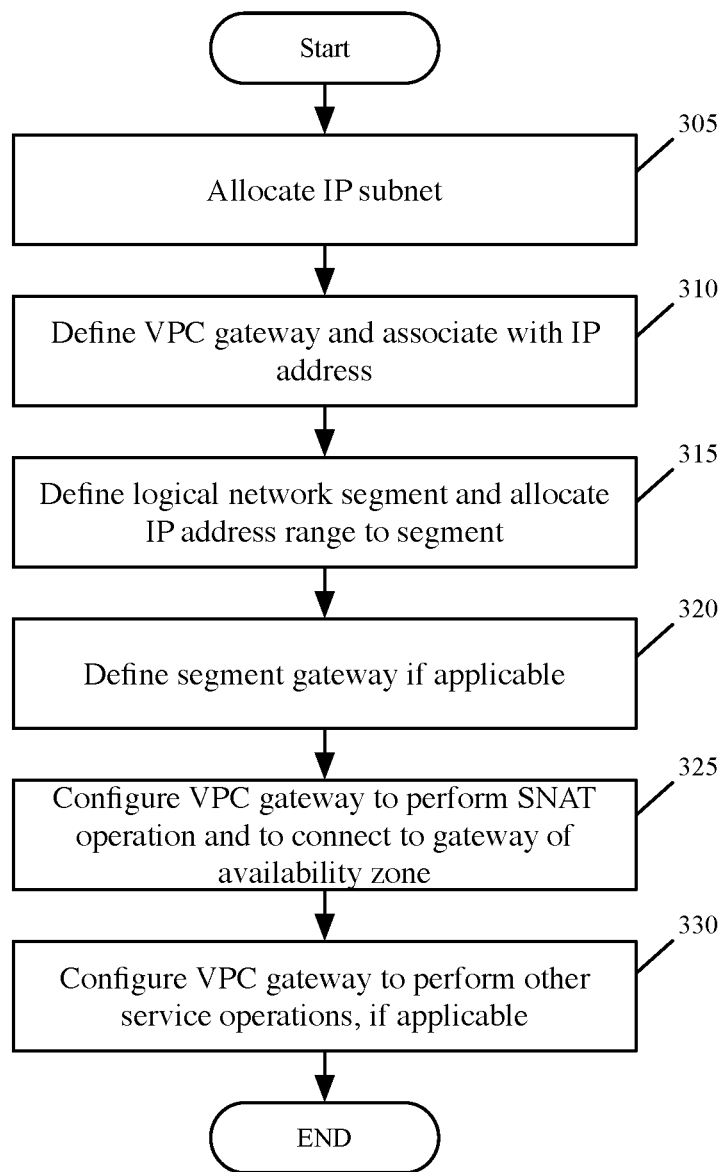
FIG. 3 conceptually illustrates a process for deploying a network for a VPC.

FIG. 3 conceptually illustrates a process 300 for deploying a VPC for an entity. In some embodiments, the NCP 145 directs the SDN managers and controllers to perform this process. In some embodiments, the process 300 starts when the NCP 145 receives an API request that requires a new VPC to be deployed. Such an API request in some embodiments might be a request to create a new logical network for a new or existing entity in an availability zone.

As shown, the process 300 initially allocates (at 305) an IP subnet for the VPC. In some embodiments, the VPC is part of a supervisor cluster that is a single routing domain with a corresponding IP CIDR (Classless Inter-Domain Routing) that specifies a range of IP addresses internal to the availability zone. The allocated IP subnet in some embodiments is a subnet from this IP CIDR. In conjunction with the allocated IP addresses, the process in some embodiments allocates MAC addresses for virtual interfaces of the VPC.

Figure 4:
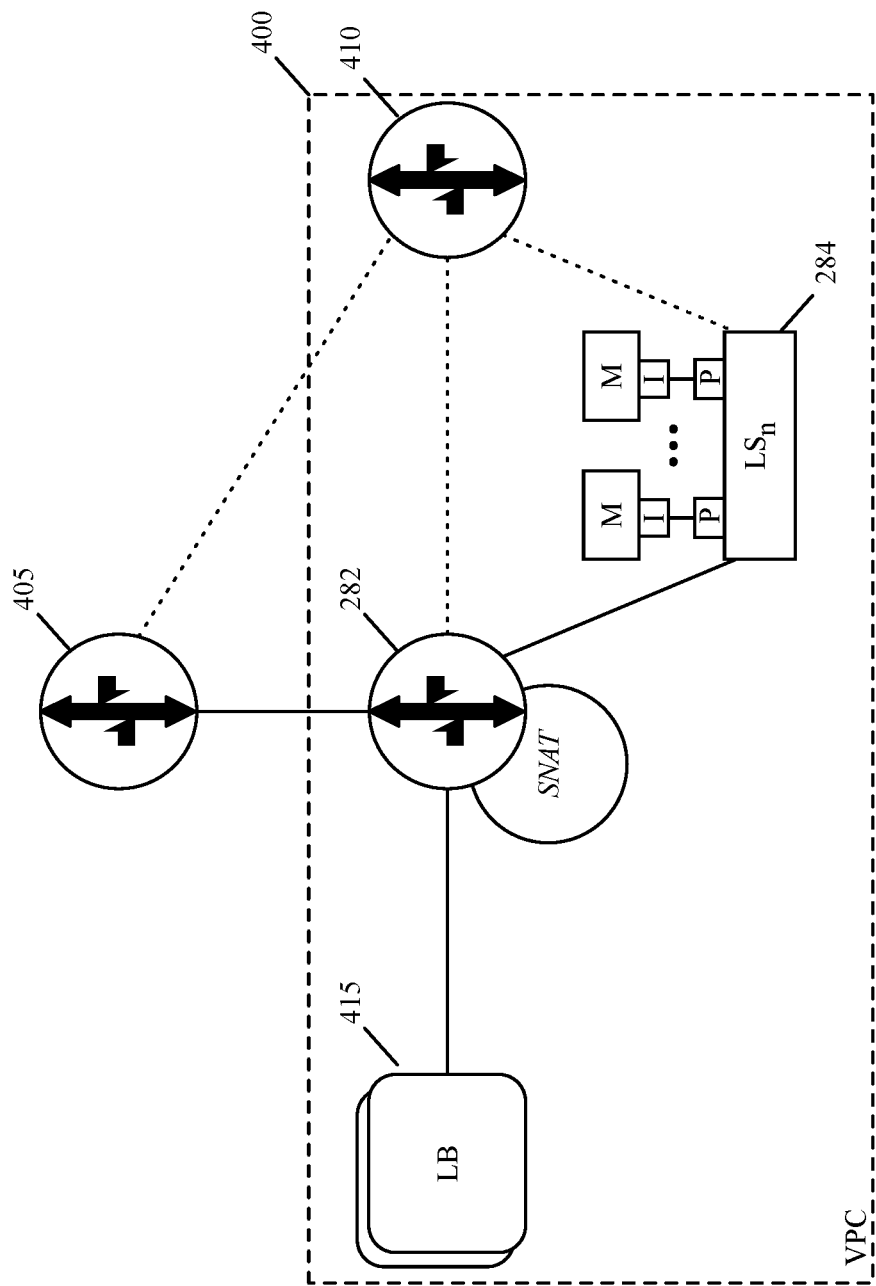
FIG. 4 illustrates another example of a logical network for a VPC.

Next, at 310, the process defines a gateway router for the VPC, and associates this gateway router with one or more of the allocated internal IP addresses. These associated addresses are addresses used by VPC switches and routers to reach the gateway. FIG. 4 illustrates an example of a VPC 400 with a gateway router 282. In some embodiments, the gateway router 282 is a logical router that has distributed and centralized components, and/or is implemented as a pair of active/active or active/standby routers, as described above.

In some embodiments, the VPC gateway router 282 is configured to connect the VPC with one or more gateway routers 405 of the availability zone (i.e., of the SDDC set that contains the VPC), in order to connect to a network external to the availability zone. Also, in some embodiments, the VPC gateway router 282 is configured to communicate with a datacenter gateway router 405 to connect the VPC gateway 282 to another VPC gateway of another VPC in order to connect the two VPCs to each other. In some embodiments, the VPC gateway router 282 is configured to forward packets directly to the gateway routers (not shown) of the other VPCs.

At 315, the process defines a segment of a logical network that it defines for the VPC and allocates a range of IP addresses to this segment. In some embodiments, this allocated range is a contiguous range, while in other embodiments it is not (i.e., the allocated IP addresses in these embodiments are not necessarily sequential). In some embodiments, the defined logical network segment includes a logical switch that is defined to connect a particular set of machines (e.g., VMs and/or Pods). FIG. 4 illustrates an example of a logical switch 284 that belongs to one logical network segment.

As mentioned above, the VPC logical network in some embodiments includes one or more logical forwarding elements, such as logical switches, routers, gateways, etc. In some embodiments, the SDN controller 115 implements the logical network by configuring several physical forwarding elements (such as software and hardware switches, routers, bridges, etc.) on host computers, edge appliances, and TOR switches to implement one or more logical forwarding elements (LFEs).

As further described below, the control system in some embodiments configures the PFEs to implement two or more LFEs to connect two or more different subsets of deployed machines that are in two or more sub-networks of the logical networks. In some embodiments, each sub-network can have one or more segments (with each segment implemented by a logical switch), connects a different subset of deployed machines, and provides a set of network elements that satisfy a unique set of connectivity requirements for that subset of machines. For instance, in some embodiments, a first sub-network (e.g., a first logical switch) connects the Kubernetes Pods, while a second sub-network (e.g., a second logical switch) connects VMs. In other embodiments, one sub-network is for VMs needing high-bandwidth, while another sub-network is for regular VMs. Additional examples are provided below.

Some sub-networks of a VPC's logical network in some embodiments can have their own sub-network gateway router. If the sub-network for the segment defined at 315 has such a sub-network router, the process 300 defines (at 320) the sub-network router for the logical network segment. As further described below, the sub-network routers in some embodiments can be configured to forward packets to the VPC gateway router (e.g., router 282) or the availability-zone router (e.g., router 405).

FIG. 4 illustrates an example of a sub-network router 410 with which the logical switch 284 and the VPC gateway router 282 are configured to communicate. In some embodiments, the sub-network router 410 is a distributed router implemented by software router 255 executed on host computers. FIG. 4 uses dash lines to illustrate the sub-network router 410 and its connections to the logical switch 284 and the VPC gateway 282, in order to signify that the sub-network router 410 might not be deployed for each sub-network of the VPC logical network. This point will be further described below by reference to FIG. 5, which illustrates several examples of virtual networks deployed based on Virtual Network CRDs. When a sub-network router is used for a sub-network, all logical switches within the sub-network are connected to the sub-network router (e.g., router 410) and not the VPC router (e.g., router 282) in some embodiments.

At 325, the process 300 configures the VPC gateway to connect to the availability-zone gateway and to perform source network address translation (SNAT) operations. For instance, in some embodiments, the process configures the VPC gateway 282 with forwarding rules for the gateway to use to forward certain data message flows to the availability-zone gateway 405. Also, in some embodiments, the VPC gateway router 282 is configured to perform SNAT operations to translate internal network addresses used within the VPC to a set of one or more external source network addresses, and to perform the reverse SNAT operations. The external source network addresses in some embodiments are addresses within the availability zone and/or are addresses to a network outside of the availability zone. In some embodiments, the VPC gateway router 282 does not perform SNAT operations for traffic exchanged between its VPC and another VPC that is deployed in the same availability zone, while in other embodiments, it performs such SNAT operations for some or all of the other VPCs.

In some embodiments, the VPC gateway 282 is configured to perform other service operations or to use service engines/appliances to perform such other service operations.

For such embodiments, the process 300 configures (at 330) the VPC gateway to perform other service operations (e.g., load balancing operations) or to forward data messages to service engines/appliances to perform such other service operations. In some embodiments, the VPC gateway is configured to perform service operations and/or forward data messages to service engines/appliances to perform such service operations, but that this configuration is not part of the process 300 when the VPC gateway is deployed and instead is part of another process that is performed subsequently (e.g., upon deployment of machines in the VPC that perform certain services or applications).

In FIG. 4, the VPC gateway 282 is configured to forward data message flows to a cluster of one or more load balancers 415 to perform load balancing operations, on ingress and/or egress traffic entering and/or exiting the VPC. The load balancing operations in some embodiments are L4 and/or L7 load balancing operations. In some embodiments, at least a subset of the deployed machines is deployed through Kubernetes, and the L4/L7 load balancing operations implement the load balancing and ingress services of Kubernetes. The VPC gateway in some embodiments performs some or all of such load balancing operations itself. Examples of gateways with load balancing ability are described in U.S. Pat. No. 9,787,605, 10,084,726, which are incorporated herein by reference. The process 300 ends after 330.

Figure 5:
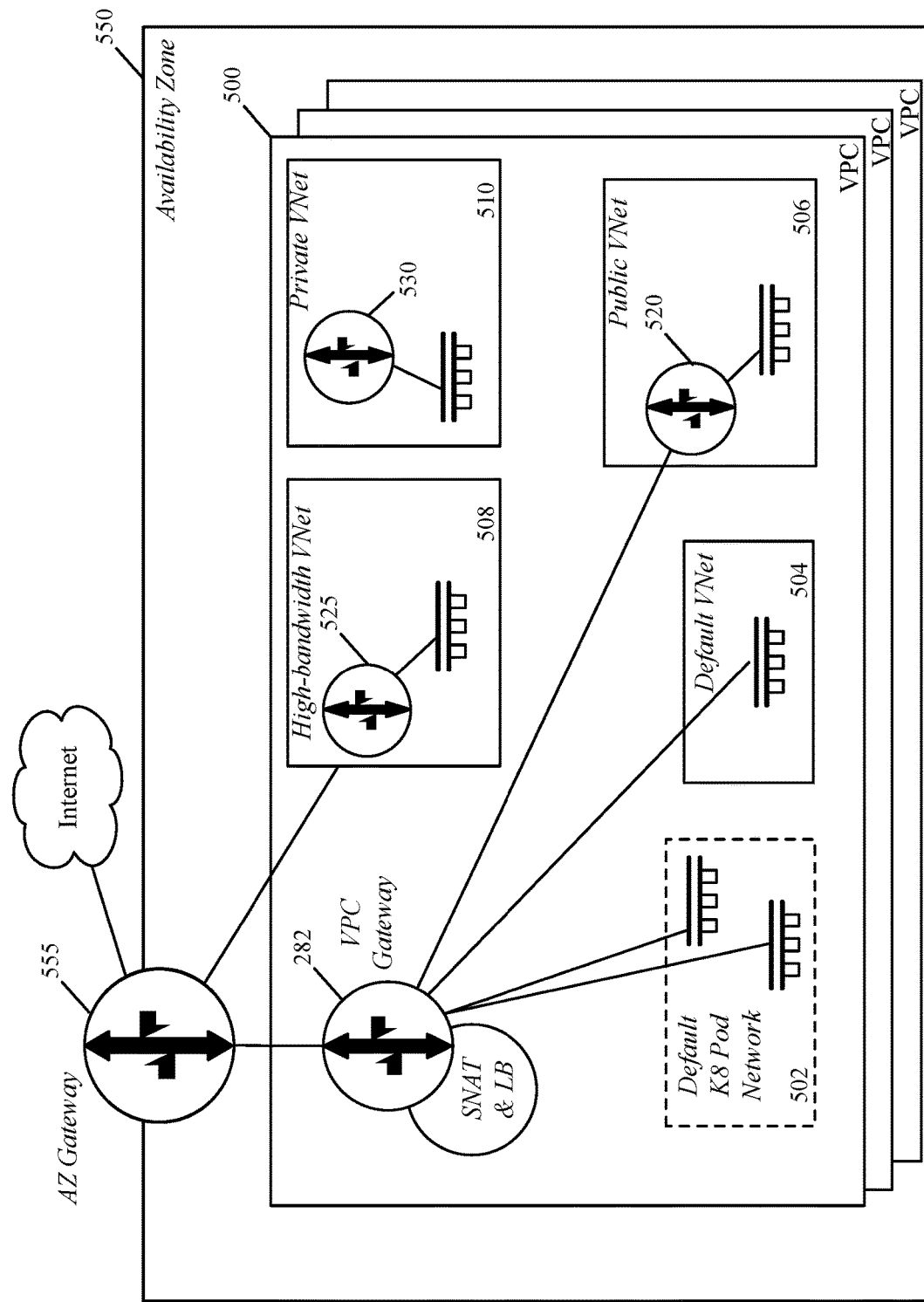
FIG. 5 illustrates examples of different sub-networks that the control system can deploy for a logical network of a VPC in some embodiments.

FIG. 5 illustrates examples of different sub-networks that the control system 100 can deploy for a logical network of a VPC 500 in some embodiments. The VPC 500 is one of several VPCs deployed in an availability zone 550. In the example illustrated in FIG. 5, five different type of deployed sub-networks 502-510 are deployed for the VPC 500, one of which is a default network 502 deployed for Kubernetes Pod and the other four 504-510 are deployed based on one of four virtual network types defined through Virtual Network CRDs.

The control system 502 deploys the default network 502 whenever it has to deploy Kubernetes Pods. For the default network 502, the control system 502 configures the network elements (e.g., the logical switches and routers that implement the default network, as well as the VPC gateway and the service nodes used by this network) to satisfy the Kubernetes networking requirements. For instance, the control system starts with one subnet from the IP CIDR of the VPC for the default network, assigns to the network interface of each Kubernetes Pod an IP address from this subnet and associates this network interface with a logical switch that is used to implement the default network 502. As more Pods are added, the control system automatically allocates extra subnets from the IP CIDR of the VPC when existing subnets are exhausted, and creates new logical switches to implement new segments of the default network for the new subnets.

Also, beyond the SNAT operations on the VPC gateway 282 described above, the control system defines firewall operations on the VPC gateway 282 to ensure that Kubernetes networking assumptions are satisfied, e.g., traffic across VPC that are within one routing domain are allowed to pass through and are not source network address translated. Also, in some embodiments, the VPC gateway 282 is configured to drop traffic that reaches the gateway from outside of the availability zone in order to isolate the VPC. The VPC administrator can define security rules to change some or all of these default settings in some embodiments.

For the Kubernetes load balancer type and Ingress type services, the control system configures the load balancer 415 of the VPC gateway 282 to provide these services for the default network 502 as well as other sub-networks. Also, in some embodiments, the control system 100 configures distributed load balancing engines on host computers to implement Kubernetes specified ClusterIP service, and configures distributed firewall engines on the host computers to implement Kubernetes specified Network Policies, again for the default network 502 as well as other sub-networks.

The control system 100 deploys the sub-networks 504-510 based four virtual network types that are defined through Virtual Network CRDs. To deploy some or all of the unique sub-networks, the network control system of some embodiments receives and processes APIs that refer to Virtual Network CRDs to define the attributes of such sub-networks. As mentioned above, the virtual-network CRDs in some embodiments include a network type value that defines a network type for the virtual networks deployed using these CRDs.

FIG. 5 illustrates the four virtual network types 504-510 of some embodiments. Each of these virtual networks is a separate sub-network of the logical network of the VPC 500. The first virtual network is a default-type virtual network 504 that includes one or more network segments in the VPC logical network with each network segment connecting to the VPC gateway router 282. The second virtual network is a public-type virtual network 506 that includes a separate gateway router 520 for the virtual network to connect to the VPC gateway router 282. This separate gateway router 520 supports separate routing table and services for the public virtual network 506.

The high-bandwidth type virtual network 508 is the third virtual network in FIG. 5. This virtual network 508 has one or more network segments connected to a separate gateway router 525 that directly connects to a gateway router 555 of the availability zone 550. This direct connection provides a higher speed connection for the high-bandwidth virtual network 508 to the network outside of the availability zone and to other resource in the availability zone outside of the VPC 500.

The last virtual network is the private type virtual network 510. It includes one or more segments of the logical network that are isolated inside the VPC and connected to their own gateway router 530. Each of the sub-networks 502-510 in FIG. 5 can have more than one segment because when all of the IP addresses in an IP range allocated to the existing segment(s) in the sub-network are used, the network control system in some embodiments deploys a new segment for the subnetwork, and allocates a new IP range to this new segment. In some embodiments, each segment of a sub-network is implemented by one logical switch that spans one or host computers that execute machines connected to the sub-network segment implemented by the logical switch.

As apparent from the four examples 504-510, each Virtual Network CRD in some embodiments defines the network and connectivity for a group of workloads sharing the same networking and connectivity requirements. Virtual network is advantageous because the workloads deployed in a VPC may have different needs for networking configuration. Front tier services, such as websites and streaming services, are always public facing. However, confidential services (e.g., certain database) are always isolated from the Internet. Hence, for such differing types of workloads, it is desirable to segregate the workloads based on different networking connectivity requirements. To provide VPCs with such subnetting functionality, some embodiments use the new VirtualNetwork (VNet) abstraction.

A sample API that refers to a virtual network CRD is as follows:
    apiVersion: vmware.com/v1
    Kind: VirtualNetwork
    Metadata:
    name: vnet-1
    namespace: vvpc-1
    Spec:
    connectivity: Private
    maximumVMs: 200
    publicVMs: 10
This API specifies that it relates to Virtual Network CRD as it refers to VirtualNetwork in its Kind field. In its metadata fields, it provides the name (vnet-1) of the virtual network being deploy, and the VPC (vvpc-1) for which it is being deployed. In its connectivity field, the API describes the type of virtual network that should be deployed. In this example, vnet-1 is designated as a private virtual network (like virtual network 510).

Upon VNet creation event, NCP will realize the corresponding network resources and routing configuration based on the connectivity field in VirtualNetwork specification, and direct the SDN managers/controllers to deploy such a virtual network with the desired network elements (e.g., switches, routers, and/or gateways). As mentioned above by reference to FIG. 5, some embodiments support 4 types of virtual network with four different types of connectivity.

In some embodiments, an administrator can place one or more VMs onto a deployed virtual network by specifying the name of the virtual network in API call that request the deployment of the VM(s). The underlying network resources for a virtual network in some embodiments include one or more NSX-T segments, connected to the VPC gateway router (which in NSX-T is a Tier1 router) or a separate virtual network router (e.g., a separate NSX-T Tier1 router) that is deployed for the virtual network (like the gateway routers 520, 525 and 530). The workloads (e.g., VMs, Pods, etc.) being placed on the deployed virtual network, map to the ports on the segments. Each segment is allocated with a subnet from the private IP block. An individual virtual network in some embodiments is not restricted to a fixed CIDR. More segments are auto-created in some embodiments when the current ones are exhausted.

The virtual network design of some embodiments has the following benefits over existing public cloud solutions. They have simplified routing configuration, because unlike cloud VPC, VPC of some embodiments do not require users to dive into the complexity of routing configuration. The NCP 145 also auto-configures the routing tables to satisfy the basic connectivity requirements. The virtual network design of some embodiments also flexibly and easily supports various networking topologies. Apart from the most common subnets' mode, public and private, this virtual network design enables users to choose different underlying resources layout based on performance considerations, as mentioned above.

This design also offers a better user experience and efficiency in subnet usage. Common cloud VPCs are criticized for the inconvenience in subnet planning. For example, in AWS, the subnet must be created with a fixed CIDR, and cannot be expanded when applications scale up later. The VPC design of some embodiments has a subnet auto-scaling mechanism, which can achieve the most efficiency in IPAM utilization, by robustly redistributing the IPAM resources across different virtual networks.

Some embodiments use virtual network CRDs to not only specify virtual networks for VPCs, but also for guest clusters working conjunctively with the VPC. In some embodiments, one or more guest clusters are defined within the same namespace as the VPC. Such guest clusters (GCs) in some embodiments have several host computers on which workload Kubernetes Pods execute, while the VPC has several host computers on which workload non-Kubernetes Pods and VM execute.

The network control system of some embodiments is part of a workload control plane (WCP) that uses NSX-T as the network and security solution for Kubernetes Pods. Kubernetes requires Node network and Pod network to be able to reach each other. Hence, in some embodiments, the master VMs in the supervisor cluster need to be attached to NSX network. At the same time, guest cluster nodes are also attached to the same NSX network, so that supervisor cluster can manage guest cluster nodes as well.

In some embodiments, the NCP 145 that is deployed on master VM provides NSX networking for WCP. In some embodiments, NCP 145 listens to WCP API server events and then directs the NSX-T managers/controllers to create the NSX resources. In some embodiments, the master VM in supervisor cluster and node VM in guest cluster do not have existing object definitions in Kubernetes. Hence, to allow the NCP 145 to create network resources for these VMs, and to provide WCP information regarding the network status regarding the configured VM network, the network control system uses Kubernetes resource CRDs to allow different administrators for different deployments define their own resources. In some embodiments, the network control system defines a set of virtual network CRDs for WCP networking for VM and non-Kubernetes Pod.

On supervisor cluster, WCP in some embodiments creates VIF object for each master VM. For guest cluster creation, WCP in some embodiments creates VNet per cluster and creates VIF object per node VM. NCP 145 watches these virtual network events, and allocates NSX network resources for VIF objects, then reports status back regarding the VIF to the network control system. WCP is then notified about the networking realization result by a CRD status update.

To use virtual network CRD to define a virtual network for a guest cluster, the API that uses the Vnet CRD for a guest cluster includes a namespace scope. For each virtual network CRD, the NCP 145 has the SDN manager/controller deploy a GC gateway router (e.g., a T1 Router), a global SNAT IP for the guest cluster, and allocate a subnet under the deployed GC gateway router. NCP also provides the SNAT IP back as part of the CRD status. In some embodiments, the master VM in supervisor cluster uses VIFs to attach to NSX network, while the guest cluster uses the virtual network to define a cluster router and subnet. In some embodiments, nodes in guest cluster use VIF CRD to create a network resource that attaches to the virtual network.

FIG. 6 illustrates an example of the virtual network CRD 605 and an intent-based API 610 for creating a virtual network based on this CRD 605 for a guest cluster. As further described below, guest clusters in some embodiments are specific workload clusters that are defined to include workload machines that perform a specific task or operate for a specific sub-entity of the entity for which a VPC is defined.

The CRD 605 defines the name, group and version attributes for the virtual network in a specification section. It also defines a name attribute in a metadata section. The virtual network API 610 defines the virtual network name for a guest cluster in a metadata section. It also specifies the guest cluster default SNAT IP attribute and specifies several condition attributes in a status section. The default SNAT IP specifies that one IP address has to be allocated for the guest cluster. The SNAT operation in some embodiments is performed by a gateway that is deployed for a guest cluster as further described below.

As mentioned above, the network control system of some embodiments uses VIF CRDs to define and deploy VIFs for non-Kubernetes Pods and for VMs. The VPC in some embodiments operates within a single routing domain that has an associated IP CIDR. Separate from the private IP CIDR of the supervisor cluster, the VPC in some embodiments owns a public IP address range. In some embodiments, the control system 100 deploys Pods using Kubernetes Pod manifest, and VMs using a VM CRDs. For a Pod workload, a private IP will be allocated to the Pod. An administrator may also request the public IP address by specifying it in the Pod's or VM's specification.

For a VM, the administrator in some embodiments can create and specify N virtual interface in the VM CRD specification. The VIF CRD defines the virtual interface, which in some embodiments will be realized as an NSX-T logical port connected to the VPC segment. NSX-T in some embodiments also realizes a VNIC for the VM. An example VIF API is shown below. The type field defines the IP addresses allocated for the interface. If the type is set as private, it will only be assigned with a private IP. If the type is set to public, in addition to the private address, a public IP address will also be assigned to this interface.

The virtual network field in this API associates the VIF being deployed to a particular virtual network. In other words, the virtual network field in the VIF API reference a particular virtual network with which the VIF is associated. When the VIF API specifies no virtual network, the VIF is connected to the default network 504. In some of the embodiments that are used by WCP, the default network is a shared Namespace network.

apiVersion: vmware.com/v1
    kind: VirtualInterface
    metadata:
      name: vifX
      namespace: vpc1
    spec:
      virtualNetwork: vnet-1
      type: private For a VIF that belongs to a network segment, the network control system in some embodiments automatically allocates an IP address from an IP subnet of the VPC IP CIDR that is automatically allocated for the segment, unless the IP addresses from the currently allocated IP subnet are all used, in which case it automatically allocates a new IP subnet from the VPC IP CIDR and automatically allocates an IP address from the newly allocated IP subnet. In addition to allocating IP addresses to the VIFs, the NCP in some embodiments also directs the SDN managers/controllers to allocate MAC addresses to VIFs, as further described below.

Figure 7:
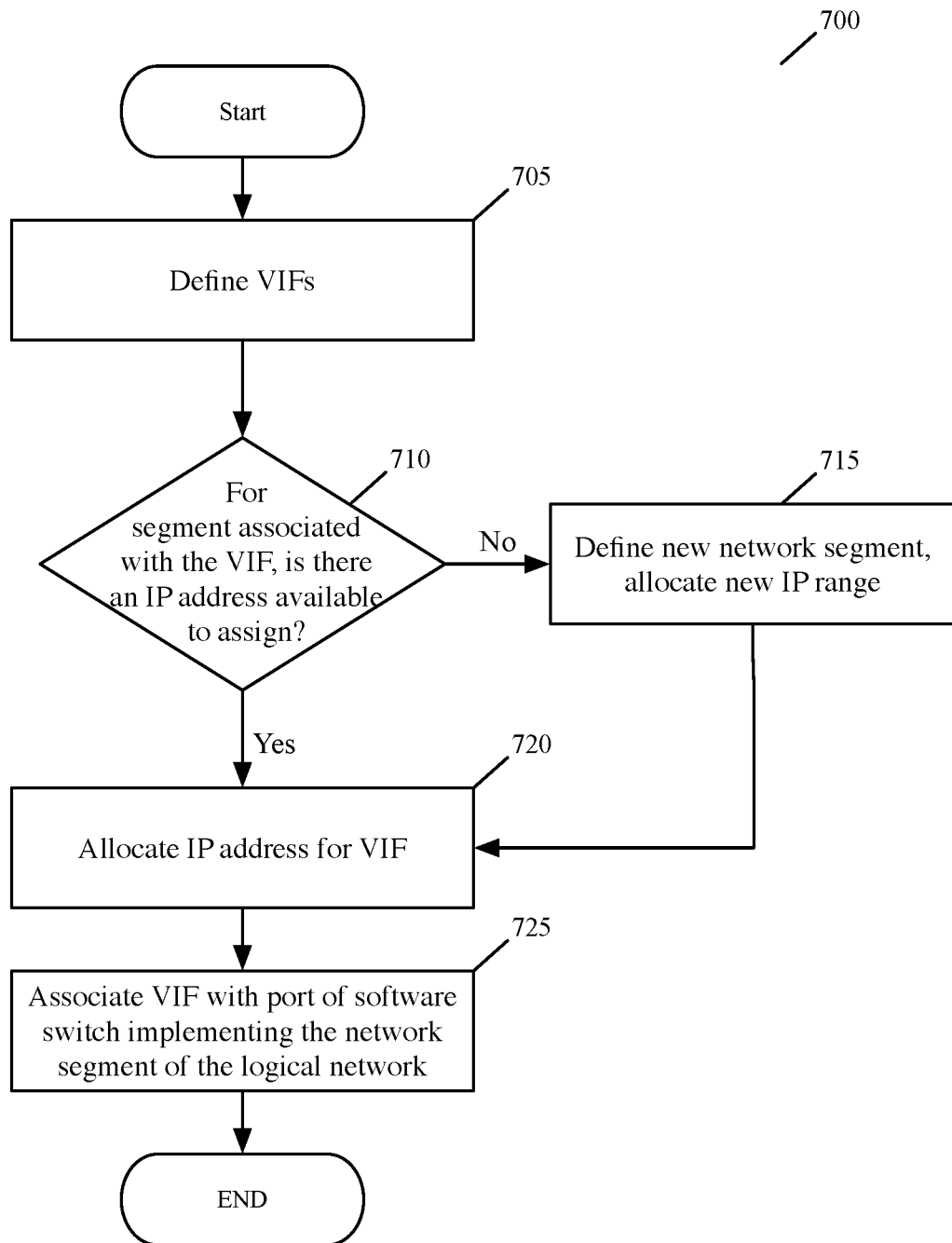
FIG. 7 illustrates an example of a process that the control system to define a VIF and allocate an IP address to it.

FIG. 7 illustrates an example of a process 700 that the control system 100 performs to auto-scale a segment of the VPC logical network, while defining a VIF and allocating a private IP address (i.e., an IP address in the VPC) for it. The NCP 145 in some embodiments performs the process 700 each time that it detects a new VIF creation event. For instance, the NCP would detect such an event each time the API server 140 receives an API that requires a new VIF to be created. Such an API in some embodiments refers to a VIF CRD. As mentioned above, some embodiments define a new VIF to connect a VM or non-Kubernetes Pod to the logical network of a VPC. Hence, in these embodiments, the VIF creation is accompanied by the configuration of a VM that is being deployed on a host computer to join a logical network.

As shown, the process 700 initially defines (at 705) a new VIF (e.g., defines a new VIF object). It then determines whether the segment (e.g., of the sub-network of the VPC logical network) to which the VIF belongs has a free IP address to allocate. The VIF API in some embodiments includes a virtual network identifier specifying the Vnet to which the VIF belongs. When the API does not provide this value or it provides a default value, the process assigns the VIF to the default network 504. The virtual network that is identified (at 710) for the VIF is the sub-network to which the VIF belongs in some embodiments. Once the process identifies the sub-network for the VIF, it then determines (at 710) whether this sub-network still has free IP addresses to assign to the VIF from a current IP address range that has been assigned for the current segment of the identified sub-network.

If not, the process transitions to 715, where it defines a new segment for the VIF's virtual network and allocates a new IP range for the new segment. In some embodiments, each new segment for a virtual network is a different logical switch. From 715, the process transitions to 720. The process also transitions to 720 when it determines (at 710) that the current IP range that has been assigned to the VIF's virtual segment has not been exhausted (i.e., still has some unassigned IP addresses).

At 720, the process assigns an IP address to the VIF from the current IP range (when the IP range has not been exhausted) or from the new IP range (when the IP range was exhausted and a new one was defined for the VIF). Next, at 725, the process associates the VIF with the port of a software switch (i.e., creates a logical connection between the VIF and the port) executing on a host computer on which the VIF's associated VM executes. The software switch in some embodiments implements the logical switch that defines the segment of the virtual network to which the VIF belongs. After 720, the process ends.

As mentioned above, the NCP can also request the SDN managers/controllers to assign a public IP address to the VIF when the API that refers to that VIF request such an IP address. In some embodiments, the process 700 allocates a MAC address to the VIF along with the IP address(es) that it allocates to the VIF. Whenever the control system 100 allocates a new segment for a sub-network (e.g., the default network 502 or the Vnets 504-510) of the logical network, the control system not only allocates IP addresses and MAC addresses, but also configures the routing tables of the logical network routers to allow the data messages to be forwarded to and from the segments.

For instance, each time a new segment of a logical sub-network is created after the first segment for this sub-network has been created, the SDN managers/controllers configure the virtual routers 255 on the hosts that have machines belonging to the sub-network with routing records (e.g., next-hop forwarding records) that allow these virtual routers to forward data messages between different segments of one sub-network. These virtual routers perform the distributed router 296 of the gateway for the sub-network.

As mentioned above, some embodiments use the VPC gateway 282 as the gateway of the sub-network while others use their own gateways 520, 525 or 530. In some embodiments, the SDN managers/controllers also configure the centralized and distributed routing components of each sub-network to forward traffic from the sub-network to the gateway and from the gateway to the sub-network, in order to allow the data message flows to be exchanged between the sub-networks and between the sub-networks and other networks outside of the VPC's logical network.

In some of these embodiments, however, the private virtual network 510 is kept secluded from the other sub-networks and from the network outside of the VPC. In sum, each time a new segment is created (e.g., at 715), the SDN managers/controllers configure multiple routing records on multiple hosts, edge devices and/or TOR switches to ensure proper forwarding of data message flows to and from the network segment. The baseline forwarding and security policies that are defined for a VPC and a guest cluster will be further described below.

The NCP 145 in some embodiments can define service rules to perform service operations with the VIF-associated machines (e.g., VIF-associated VMs and/or non-Kube Pods) being at the client-end or the server-end of these service operations and/or server operations. For instance, when the VIF-associated machines are at the client-end of such operations, the NCP 145 in some embodiments defines hooks (i.e., function calls) at the software-switch ports connected to the VIFs so that distributed load balancing operations can be performed by load balancing engines executing on the same host computers as the VIFs, in order to distribute the data message flow egressing from the VIF-associated machines among several service nodes that perform the service operations.

In some embodiments, the NCP 145 defines such hooks to implement ClusterIP services defined in Kubernetes APIs (e.g., to distribute data message flows from one or more VIF-associated client machines among several service engines, appliances and/or machines), as well as other distributed load balancing services described in this document. Also, the NCP 145 in some embodiments defines such hooks to distribute data message flows from one or more VIF-associated client machines (e.g., Pods and/or VMs) among several different compute nodes (e.g., VMs, Pods, etc.) that perform the same distributed compute operations (e.g., execute the same server tier, such as the Webserver tier, appserver tier, database server tier, etc.). Hence, the end nodes among which the hooked-in load balancers distribute the data message flows can be service nodes or compute nodes.

Figure 8:
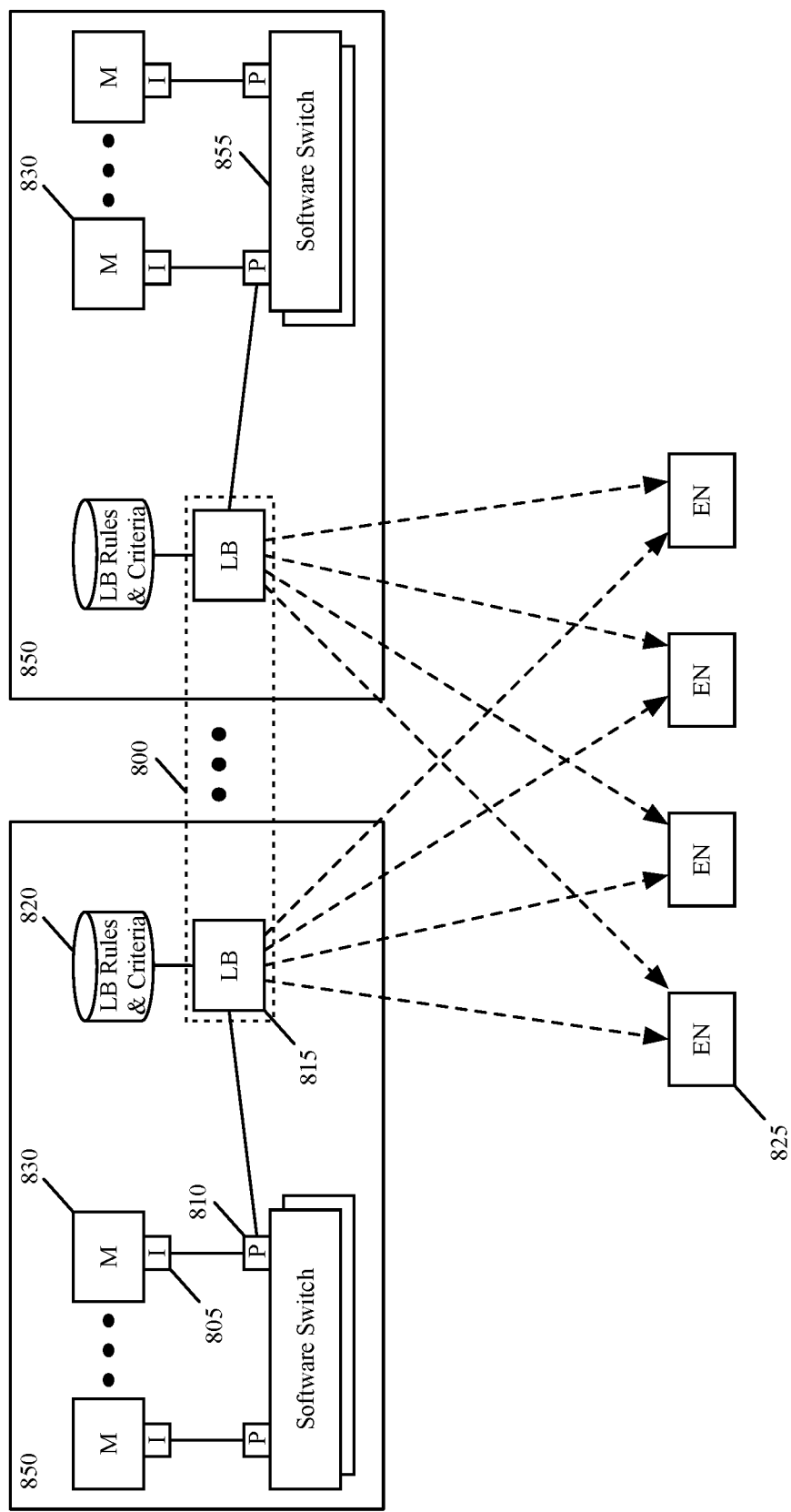
FIG. 8 illustrates an example of distributed load balancer that the control system defines for several VIF-associated machines on several host computers in some embodiments.

FIG. 8 illustrates an example of distributed load balancer 800 that the NCP defines for several VIF-associated machines 830 on several host computers 850 in some embodiments. At the behest of the NCP 145, the SDN managers/controllers in some embodiments configure the software switch ports 810 to which the VIFs 805 connect (i.e., with which the VIFs are associated) with hooks to load balancers 815 executing on the same host computers as the VIFs. In some embodiments, one load balancer 815 is instantiated for each VIF that needs associated client-side load balancing operations. Each load balancer in some embodiments is a service engine provided by a hypervisor executing on the same computer as the machines 830.

The hooks are configured to direct to their respective load balancers ingress and/or egress traffic entering or exiting (provided by or provided to) the VIF-associated machines. Each load balancer 815 uses a set of load balancing rules (stored in an LB rule storage 820) to identify the set of end nodes 825 that should process data message flows entering or exiting the machines 830. In some embodiments, the load balancer then uses load balancing criteria (e.g., weight values for round robin selection of end nodes) to select an end node for each data message flow, and then forwards one or more data messages of a flow to the end node selected for that flow. As shown, the load balancing rules and criteria are stored in the LB rule storage 820 in some embodiments.

This selection of the load balancer for a data message flow can be stateful in some embodiments so that all the data messages of one flow are sent to different one end node 825. Alternatively, this selection can be stateless in some embodiments so that different data messages of the same flow are sent to different end nodes. Also, in some embodiments, the load balancer can be configured to only send the first data message or first few data messages of a flow to the end node machines.

The end nodes 825 in some embodiments can be service nodes in case of ingress or egress traffic, or destination compute nodes in case of egress traffic. The end nodes can be engines/machines on the same host computer 850 as the client VIF-associated machines and the load balancers, can be engines/machines on different host computers, or can be standalone appliances. In some embodiments, the end nodes are associated with a virtual network address (e.g., a VIP address) or a set of associated network addresses (e.g., a set of associated IP addresses). In some embodiments, the end nodes machines are Pods, VMs, and/or containers executing on Pods/VMs.

When forwarding data messages to end node machines residing on the same host computer, a load balancer 815 forwards the data messages through a software switch 855 on its host computer 850 in some embodiments. Alternatively, when forwarding data messages to end node machines not residing on the same host computer, the load balancer 815 forwards the data messages through its host's software switch 855 and/or software routers (not shown) and intervening network fabric.

Figure 9:
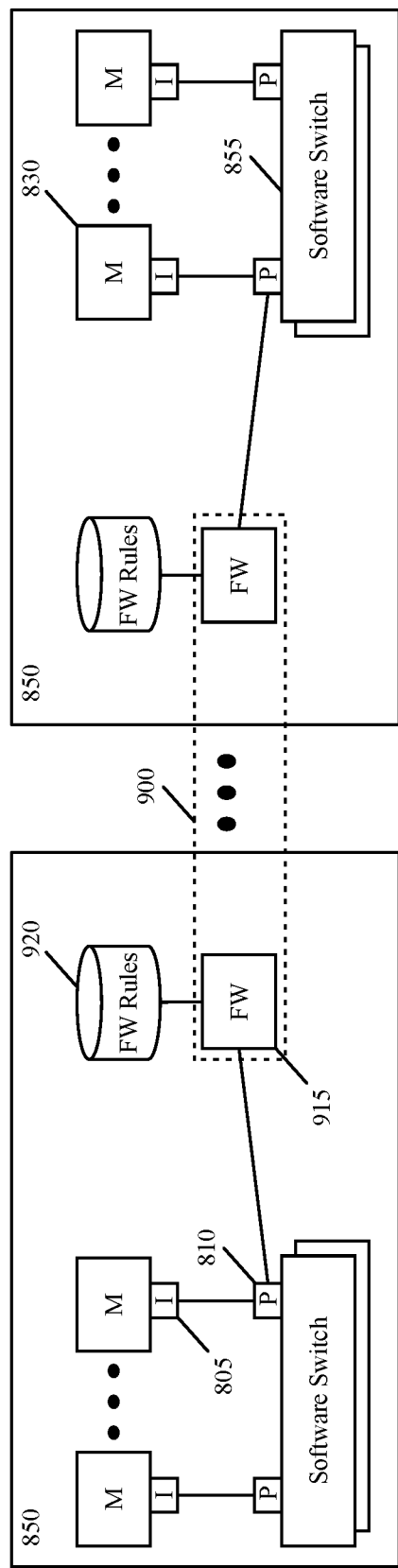
FIG. 9 illustrates an example of distributed firewall that the control system defines for several VIF-associated machines on several host computers in some embodiments.

The NCP 145 in some embodiments directs the SDN managers/controllers to configure hooks in the VIF-associated ports 810 for other middlebox service operations, such as firewall, intrusion detection, intrusion prevention, deep packet inspection, encryption, etc. FIG. 9 illustrates an example where the port hooks are configured to direct ingress/egress data message flows from/to a VIF-associated machine 830 to a firewall engine 915 on the same host computer 850 that performs firewall operations on these flows. The firewall operations in some embodiments determine whether the data message flows should be allowed to pass through to the machine or software switch, should be dropped, or should be redirected to another service machine or appliance.

As shown, several firewall engines 915 on several host computers implement a distributed firewall 900. In some embodiments, multiple such firewall engines execute on the same host computer for multiple different VIF-associated machines for which distributed firewall operations are configured. To perform their firewall operations, the firewall engines use firewall rules stored in a firewall rule storage 920. The firewall rules are defined by the SDN managers/controllers at the behest of the NCP 145 in some embodiments. In some embodiments, the NCP 145 defines the distributed firewall operations to implement Network Policies services defined in Kubernetes APIs, as well as other firewall operations described in this document.

As mentioned above, the control system 100 in some embodiments can configure the service and forwarding rules to have the VIF-associated machines perform service- or server-end operations. To facilitate the use of VIF-associated machines as service machines or server machines, some embodiments use Endpoint Group CRDs. To simplify the inclusion of VIFs in endpoint groups, the metadata filed for VIFs in some embodiments includes a label field that can be used to specify one or more labels for the VIF. The label field in some embodiments can include one or more key value pairs, with each pair specifying a label and a value for the label.

To further illustrate such labels, FIG. 10 illustrates an example VIF CRD 1000 and an API 1005 that refers to this CRD. As shown, the VIF CRD 1000 specifies that VIF has one or more metadata fields. It also defines the VIF to have a specification that includes a group to which the VIF belongs, one or more version attributes for the VIF, a scope for the VIF and one or more names for the VIF.

The API 1005 has a virtual network field that identifies guest-cluster-network1 as the virtual network with which the VIF is associated. This virtual network is the network to which the VIF and its associated machine (e.g., Pod) belong. The virtual network field is optional. When it is not provided, NCP will associate the VIF with the default network 504. For each VIF specified by an API, NCP will create a Port with allocated IP address and an allocated MAC address. NCP will report the realization result back as a CRD status, which the compute manager (e.g., WCP) receives and then configures the associated machine (e.g., VM or Pod) accordingly.

The VIF API has an interfaceID field for defining the VIF identifier (VIF ID). It also has fields that specify that VIF has associated IP address, gateway, subnet mask, and a MAC address. It further specifies that the VIF has a logical switch with a logical switch ID. In some embodiments, these parameters are provided by the SDN managers/controllers 110/115 at the behest of the NCP 145, as described above. The VIF API has a set of metadata fields, which includes Labels. In the example of FIG. 10, the Labels are two key value pairs, one defining the VIF as belonging to a compute component, and the other defining the VIF's machine as being a production type machine. As further described below by reference to Endpoint Group CRDs and APIs, labels can be used as a selector to define a group of VIF.

As VIFs can be associated with non-Kubernetes Pods and VMs, labels allow endpoint groups to be defined to include heterogeneous type of groups of machines that can serve as the server- or service-nodes for data messages. Endpoint groups are dynamic grouping objects that can be created in some embodiments by using Endpoint Group CRDs and APIs. In some embodiments, the machines that can be associated through an endpoint group can be of the same type or of different types. For instance, in some embodiments, an endpoint group can be defined to include VIFs and Pods through the labels that are associated with VIFs and Pods. More specifically, in some embodiments, administrators can specify an endpoint group (i.e., can define members of the group) by specifying an IP address CIDR or a list of selectors. The selectors in some embodiments relate to different types of network elements. For instance, the selectors in some embodiments include VIF selectors, Pod selectors, Namespace selectors, and Service selectors.

Figure 11:
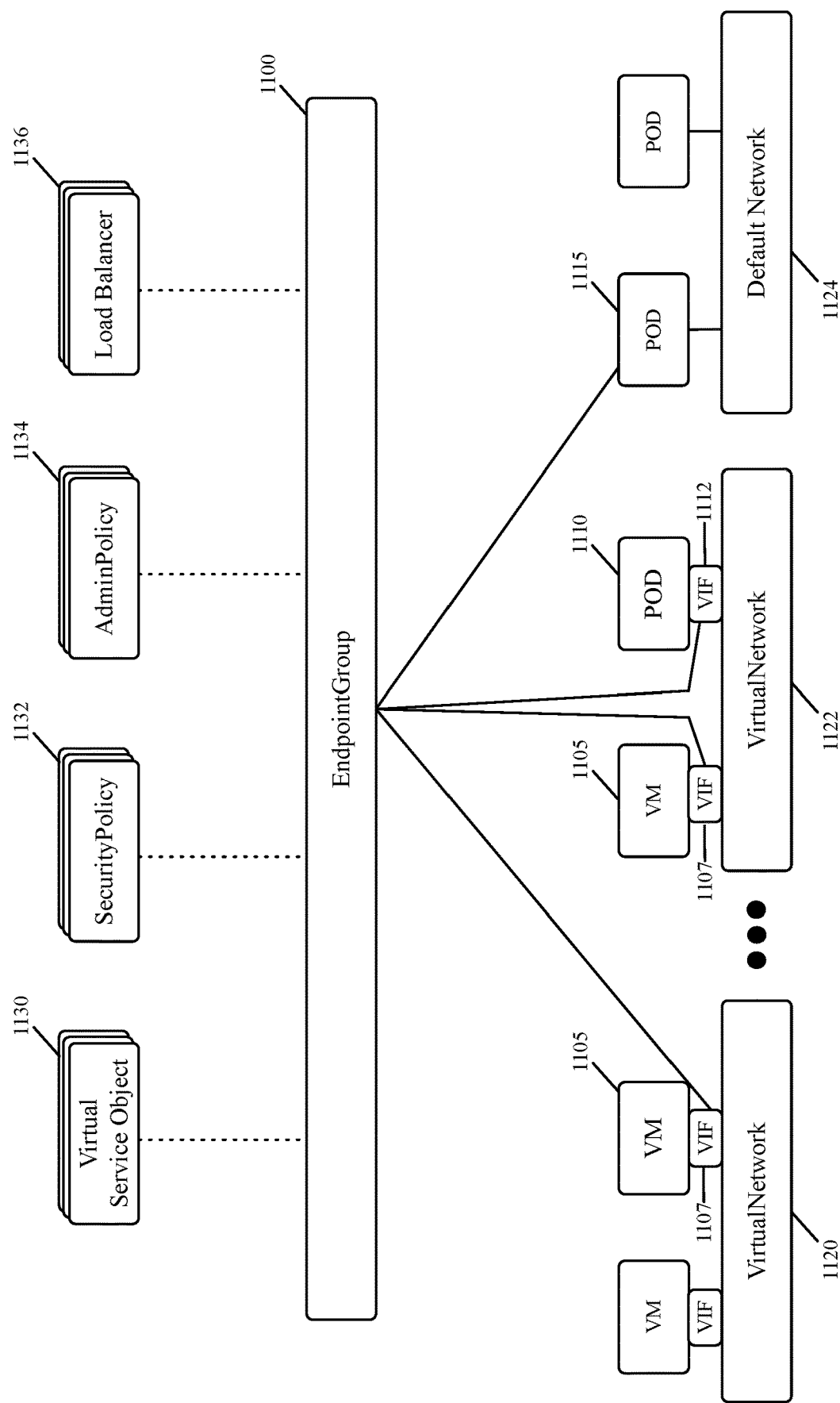
FIG. 11 conceptually illustrates an example of an endpoint group.

FIG. 11 conceptually illustrates an example of an endpoint group 1100 that includes two VMs 1105, a non-Kubernetes Pod 1110, and a Kubernetes Pod 1115. As shown in this example, the endpoint group is associated with the VMs and the non-Kubernetes Pod through their VIFs 1107 and 1112 of these machines, while it is associated directly with the Kubernetes Pod 1110. In this example, the VMs 1105 and non-Kubernetes Pod 1110 are deployed on two virtual networks 1120 and 1122 (which in some embodiments can be any of the networks 504-510), while the Kubernetes Pods are deployed on a default network 1124 (which in some embodiments is the default network 502).

In some embodiments, a selector can identify a group of network elements (VIFs, Pod, Namespace, Service) in terms of one or more of attributes of the network elements, including any label that has been specified for the network elements. Selectors provide an easy way for forming endpoint groups with dynamic membership for various kinds of workloads because the selectors can be defined in terms of attributes (e.g., labels) that are associated with sets of network elements that can dynamically change.

Such groups can then be used to perform services, security, and compute operations. For instance, as mentioned above, endpoint groups and VIFs can be used to define a set of machines of the same type or different types to provide service or compute operations (e.g., ClusterIP services) specified by the API requests. FIG. 11 conceptually illustrates the endpoint group 1100 being used to define virtual service objects 1130, security policies 1132, administrative policies 1134, and load balancing objects 1136.

Below is a sample API call that refers to an Endpoint Group.

apiVersion: vmware.com
    kind: EndpointGroup
    metadata:
      name: foo
    spec:
    targets:
      ip-block: null
      vifSelector:
      virtualNetwork: vnet-1
      namespace: vvpc-1
      name: null
      matchLabels:
        app: frontTier In the above YAML code, the endpoint group foo is defined to include all VIFs inside vvpc-1 namespace, on the virtual network vnet-1 and associated with the label 'app=frontTier'. In some embodiments, the administrators can also specify the name of the resource (e.g., the name of the VIF) to perform an exact match. This grouping method provides maximum configuration flexibility. It supports having different type of Kubernetes resources in the same group, as well as groups spanning across different virtual networks (e.g., networks 504-510), even different VPCs.

Figure 12:
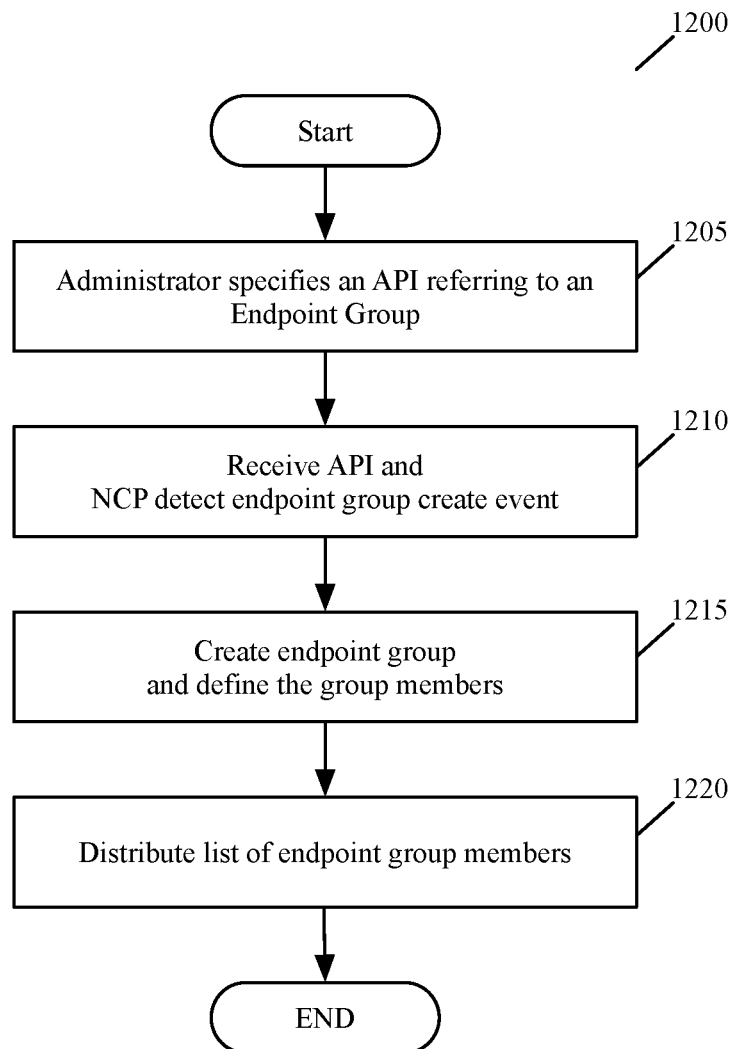
FIG. 12 conceptually illustrates a process for creating an endpoint group.

FIG. 12 conceptually illustrates a process 1200 for creating and using an endpoint group. As shown, the process starts by an administrator specifying (at 1205) an Endpoint Group API based on a set of selectors that define the members of the endpoint group. Next, at 1210, the API server 140 receives this API, and the NCP 145 detects a create endpoint group event. Through the SDN managers, the NCP directs (at 1215) the NSX-T SDN managers 110 (which then direct the SDN controllers 115) in some embodiments to create an NSX-T group (e.g., an NSX security group) for the endpoint group, and define the group members to be the corresponding NSX-T resources (e.g., VNICs, Pod interfaces, etc.) that are mapped to the resources (e.g., the Kubernetes resources) with the matching attributes.

At 1220, the definition of the endpoint group (i.e., the list of members of the endpoint group) is distributed to host computers and edge appliances that use this definition to resolve service and forwarding rules defined in terms of the endpoint groups. For endpoint groups that include VIFs and Kubernetes Pods, the endpoint group definition in some embodiments includes the endpoint group identifier plus a list of IP addresses of the VIFs and Pod interfaces that are members of the group. Each time new network elements are added with attributes that match the attributes of the endpoint group's selector(s), an updated list of members is distributed to the host computers and edge appliances.

Figure 13:
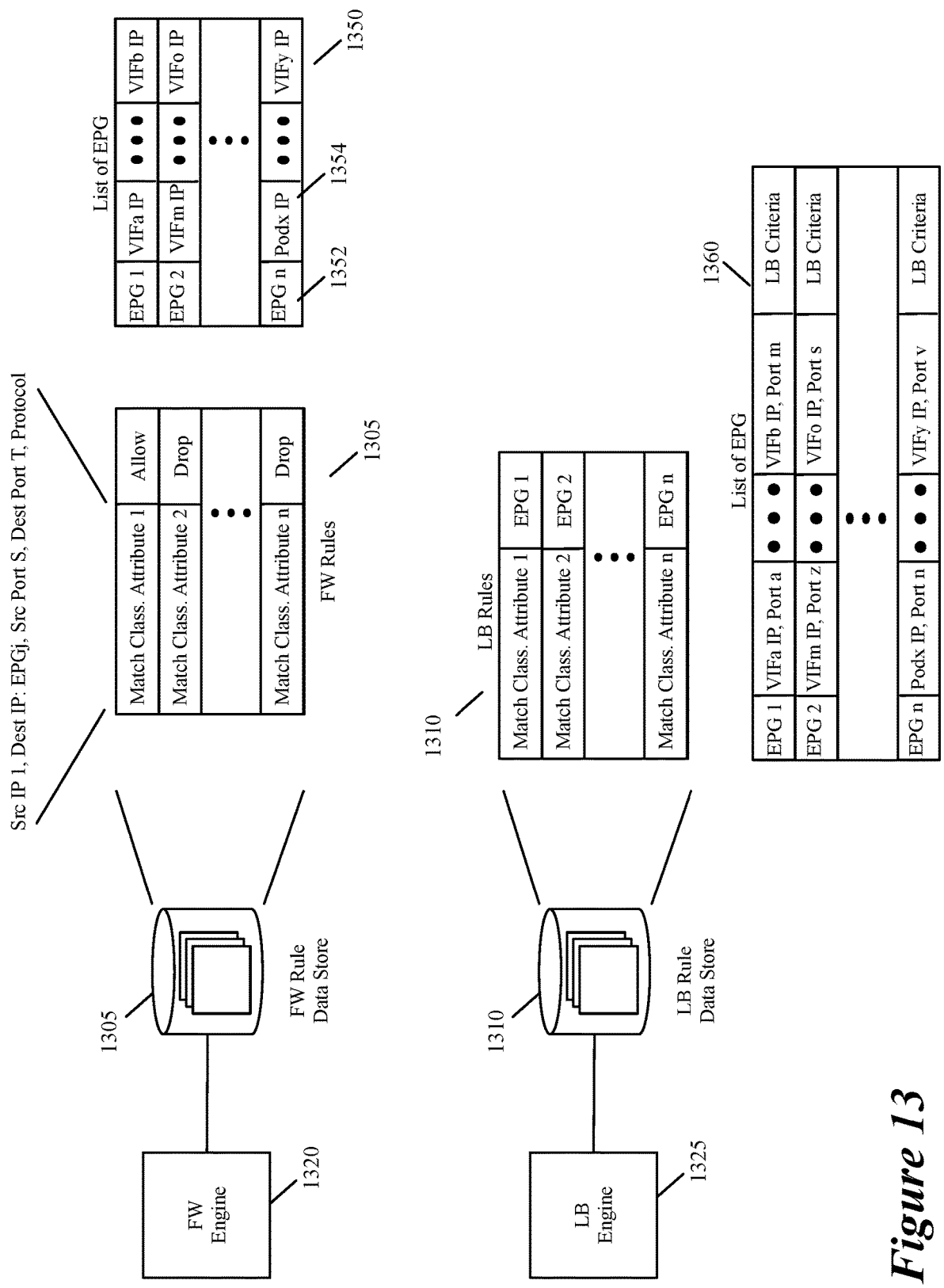
FIG. 13 illustrates an example of firewall rules and load balancing rules that are defined in terms of endpoint groups.

FIG. 13 illustrates an example of firewall rules 1305 and load balancing rules 1310 that are defined in terms of endpoint groups. These rules are processed by a firewall engine 1320 and load balancing engine 1325 executing on a host computer and/or edge appliance. In this example, the endpoint groups are used to define one or more match classification attributes of some or all of the firewall rules 1305 (e.g., the destination IP field of the firewall rule).

As further described below, some embodiments define each member of an endpoint group in terms of a port address as well as an IP address. In such embodiments, the endpoint group's associated IP and port addresses can be used to define source and/or destination IP and port values of service rules (e.g., firewall rules or other middlebox service rules) that are processed by middlebox service engines to perform middlebox service operations.

In some embodiments, the endpoint groups illustrated in FIG. 13 are NSX security groups that are deployed by the SDN controllers. These security groups are the equivalent to the endpoint groups specified by the Kubernetes APIs and identified by the NCP that processes these APIs. Similarly, the Pod and VIF (and other data plane deployed network constructs) are the equivalent constructs to what is defined by the APIs and the NCP. From some network elements, there is a 1-to-1 mapping between the SDN deployed element and the element defined by the API, while for other network elements, there is not a 1-to-1 mapping.

When the firewall engine 1320 receives a data message, the firewall engine determines whether the flow identifier of the message matches the match classification attributes of one of its firewall rules, and if so, it performs the action of the highest priority matching rule. When the matching classification of a firewall rule includes an endpoint group identifier, the firewall engine uses a list of endpoint groups 1350 to resolve the endpoint group identifier to a list of member IP addresses, and then determines whether the received message's flow identifier has a header value that falls into this member IP list. As shown, the endpoint group list 1350 includes several endpoint group identifiers 1352, and a set of IP addresses 1354 of the VIFs and Pods that are members of that endpoint group.

When an endpoint group identifier is used to identify a destination IP field of a firewall rule, the firewall engine determines whether the destination IP address in the received message's header (in its flow identifier) is an IP address in the endpoint group's definition in the endpoint group list. If so, and if the rest of the data message's flow identifier matches the remaining match classification attributes of the firewall rule, the firewall engine 1320 then determines that the firewall rule matches the data message, and then performs a firewall operation (e.g., allow, drop, etc.) on the flow based on the matching firewall rule's action attribute.

In some embodiments, the endpoint group is identified by an IP address and a port address. In some such embodiments, the firewall engine 1320 uses an endpoint group list to resolve an endpoint group identifier in a firewall rule's match classification attribute set to IP and port addresses (e.g., destination IP and port addresses). It then compares the resolved IP and port addresses to the corresponding IP and port addresses of the received data message to determine whether the data message matches the firewall rule's match classification attributes.

In FIG. 13, the load balancing rules 1310 use endpoint groups to define a destination for matching flows. The load balancing engine 1325 compares a received data message's flow identifier (e.g., five-tuple identifier) with the match classification attributes of one or more load balancing rules to determine whether the data message matches one of these rules. If so, the load balancing rule identifies an endpoint group identifier specified by the matching rule.

The endpoint group identifier in some embodiments identifies an endpoint group identified in an endpoint group list 1360. As shown, the endpoint group list 1360 has multiple rows, with each row indexed by a different endpoint group identifier, representing a different endpoint group and specifying the attributes of the endpoint machines in the group. In this list, each endpoint machine is associated with a VIF or Pod interface, and is either specified by an IP address and a port value when the VIF is associated with a VM or a non-Kubernetes Pod, or by an IP address and a protocol when the interface is associate with a Kubernetes Pod. For a VM or a non-Kubernetes Pod, the port value in some embodiments includes or is associated with a protocol.

The load balancing engine uses the list of endpoint groups 1360 to resolve the endpoint group identifier to (1) a list of IP addresses of member VIF and Pods that are members of the endpoint group, and (2) a set of load balancing criteria (e.g., weight values) for the IP addresses in the list. For VMs and non-Kubernetes Pods, the endpoint group list in some embodiments provides with the IP address of each VIF, a port to use to access the service or compute provided by the endpoint machine associated with the VIF. For Kubernetes Pods, the endpoint group list 1360 in some embodiments provides the VIF IP along with a protocol (e.g., http) to use to access the service or compute operation provided by the endpoint machine associated with the VIF.

Based on the load balancing criteria, the load balancing engine then selects one of endpoint machine from the list (e.g., one IP address in the list), replaces the destination IP address of the data message with the selected IP address, replaces the destination IP port with the destination port associated with the selected IP address if applicable, and then provides the data message to a forwarding element (e.g., a software switch on its host computer) to forward to the newly specified destination IP address. These are the operations performed for VMs and non-Kubernetes Pods.

For Kubernetes Pods, the load balancing engine does not replace the destination IP port, but rather uses the protocol specified by the endpoint group list for the selected endpoint machine. Also, for VMs and non-Kubernetes Pods, the destination port of the received data message in some embodiments corresponds to the destination port used by all the end point machines for providing the service or compute operation. In such embodiments, the load balancer does not need to replace the destination port address before forwarding the data message to the selected endpoint machine.

Figure 14:
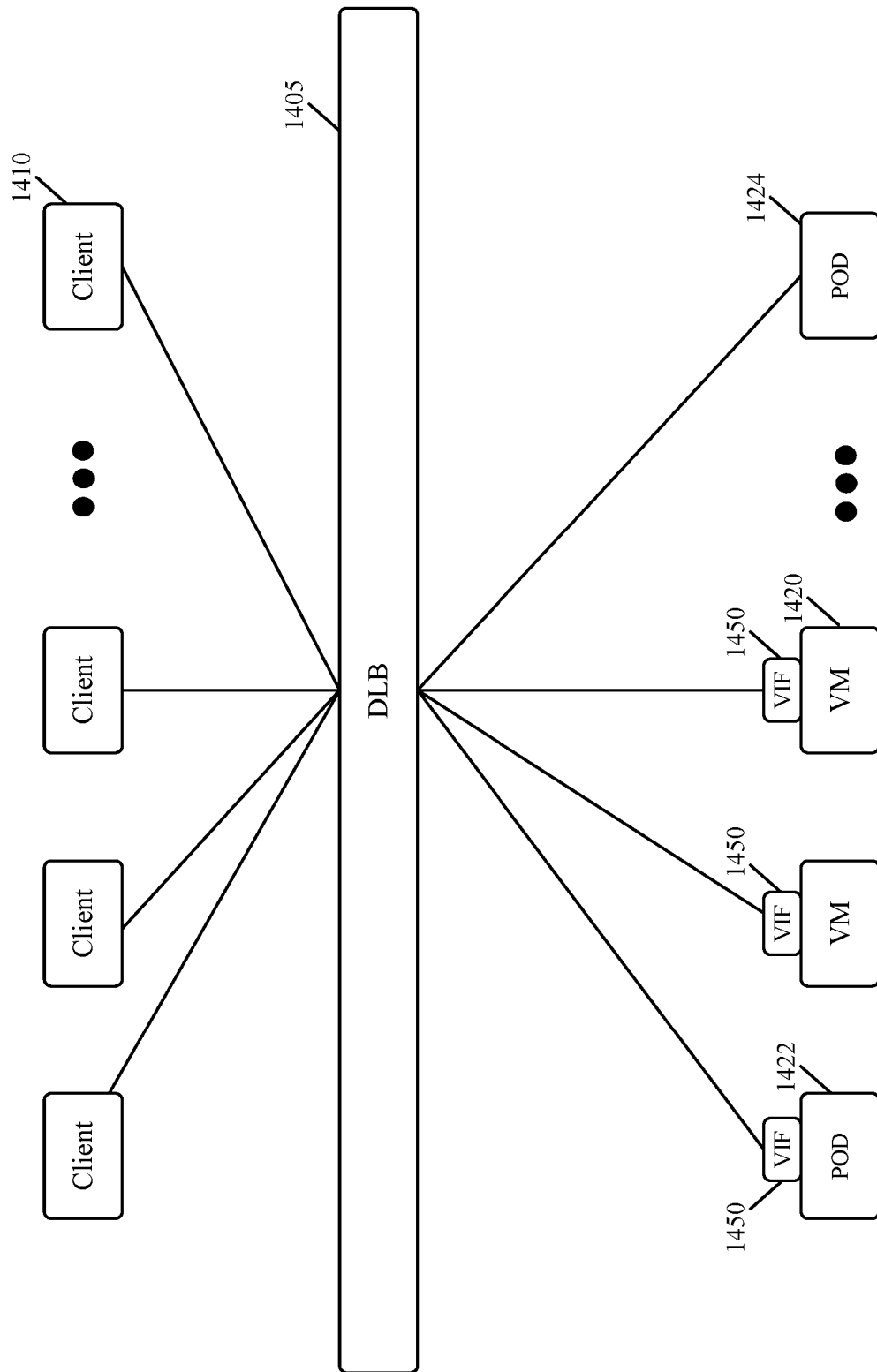
FIG. 14 illustrates a distributed load balancer distributing the data message traffic load across the members of an endpoint group.

FIG. 14 illustrates a distributed load balancer (e.g., implemented by load balancers 815 on several host computers 850) distributing the data message traffic load for a particular service- or compute-operation across the members of an endpoint group. In this example, the load balancers that implement the distributed load balancer (DLB) 1405 match data message flows from a set of client machines 1410 to a load balancing rule 1310 that specifies an endpoint group identifier. In some embodiments, the destination IP address of the matching flows is specified in terms of a destination VIP address. Hence, in these embodiments, the inclusion of the endpoint group identifier in the matching load balancing rule signifies that messages addressed to the destination VIP address should be distributed to the endpoint group corresponding to the endpoint group identifier. In this example, the endpoint group is a group that includes a Pod 1424 and three VIFs 1450 associated with a Pod 1422 and two VMs 1420.

For a received data message flow, the DLB 1405 in some embodiments identifies the members of the endpoint group by using endpoint group list. It then uses the load balancing criteria (e.g., based on weight values for round robin selection of member machines) specified in the endpoint group list for the identified endpoint group, in order to select a machine from the endpoint group for the flow. The DLB 1405 then replaces the destination VIP address and destination port address in the received data message flows with the resolved IP and port addresses of the endpoint machine selected for the flow, and then forwards the data message flow to this endpoint machine.

In the examples illustrated in FIGS. 13 and 14, the firewall and load balancing rules are expressed in terms of endpoint group identifiers. In these examples, the firewall and load balancing engines in the data plane resolve the endpoint group identifiers to find matching rules or to perform the load balancing operation of the matching rules. In other embodiments, the control plane (e.g., local control agents on host computers and edge appliances) resolve the group memberships in order to express the rules in terms of member IP addresses and not in terms of the endpoint group identifiers. Also, some embodiments also use endpoint groups to specify forwarding rules. When used to specify forwarding rules, endpoint groups are used to specify the source and/or destination addresses in the match classification attributes of the forwarding rules (e.g., of policy-based routing rules).

For Kubernetes deployments, some embodiments use the following workflow to deploy ClusterIP services for endpoint groups. Initially, the administrator creates the endpoint group to describe the selectors. FIG. 15 illustrates examples of an Endpoint Group CRD 1502 and an API 1504 that refers to this CRD. As shown, the API 1504 has a several specification attributes, which include a vifSelector attribute that specifies that the endpoint group includes VIFs that (1) are part of the virtual network vnet_name and (2) have valueX for labelX.

In some embodiments, an endpoint group is defined not only in terms of VIFs, but also in terms of ports/protocols. This is because one VM or Pod can have multiple containers and the port/protocol attributes are needed to differentiate the different containers (e.g., the different services or compute) operations performed on the VM or Pod. Ports are also needed to perform L4 load balancing on the endpoint groups. When the endpoint group definition does not provide a port, a default port is assigned to the endpoint group in some embodiments. In FIG. 15, the endpoint group's specification attributes define the ports/protocols to be used for accessing the endpoint group. In this example, the endpoint group can be accessed through https TCP port 6443, and DNS UDP port 5353.

The creation of the endpoint group triggers the workload controller to create a Kubernetes ClusterIP Service without selector. FIG. 15 illustrates an example of an API 1506 generate a ClusterIP Service without a selector. Based on the name and port attributes specified in the Endpoint Group API 1504, the service-creating API 1506 specifies the name and port attributes of the service. It also specifies the type of service as a ClusterIP type of service.

After creating the CluserIP Service without the selector, the workload controller then fills in the related Kubernetes endpoint information according to the selectors in the endpoint group. FIG. 15 illustrates an example of an API 1508 that provides the related Kubernetes endpoint information. In this example, the API 1508 provides the IP addresses of the VIFs in the endpoint group. The administrator then creates a virtual service object and uses endpoint group as a destination of the virtual service object. Virtual service objects will further be described below.

This workflow can be used with other Kubernetes services, such as Ingress, IngressRoute, OpenShift Route, Istio VirtualService and other load balancing solutions. Most third-party solutions allow the use of a Service as destination and they can understand Kubernetes Endpoints. However, except the workload controller, other existing service deploying modules do not know the selector, and there is no means to obtain the selector criteria via Kubernetes API. This problem is solved by initially defining the endpoint group. This approach also provides a chance for NSX-T to expose better load balancing experience through virtual service objects and also allows WCP to integrate with third-party load balancers.

VIFs provide one way of exposing a single VM or non-Kubernetes Pod to an external or internal network. Virtual service objects expose multiple workloads with load redistribution to machines inside of the VPC network or outside of the VPC network. Specifically, some embodiments use a virtual service object (VSO) CRD to expose a load-balanced service or other workload (e.g., a middlebox service or an application tier, such as Webserver, AppServer, database server) provided by two or more machines inside of the VPC to machines outside of the VPC or to machines inside of the VPC. As endpoint groups can have different types of machines, VSOs are used to expose in a load-balanced manner different types of machines that perform the same service or compute operations.

Figure 16:
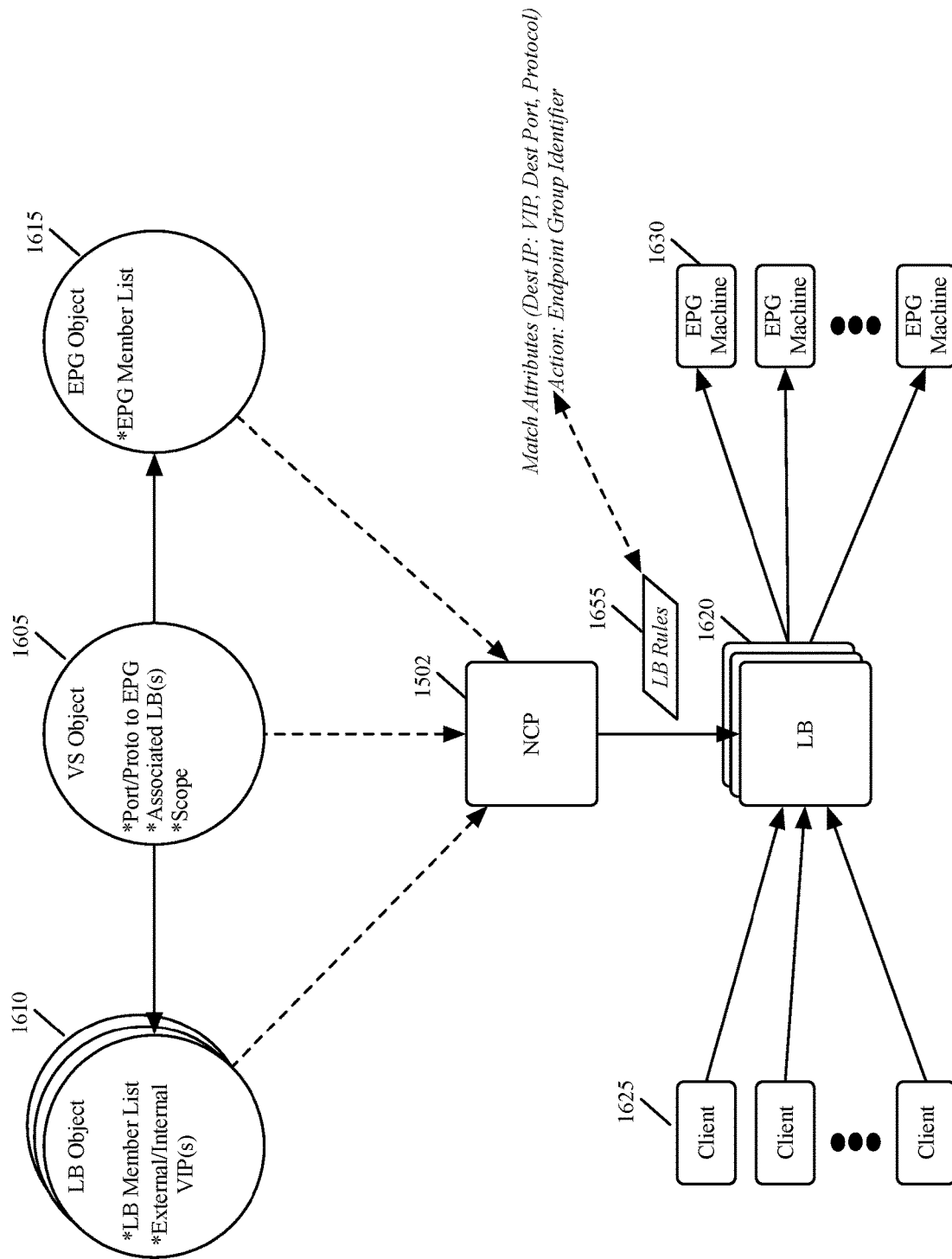
FIG. 16 illustrates a virtual service object (VSO) of some embodiments.

FIG. 16 illustrates how the VSOs are used in some embodiments. Specifically, this figure illustrates a VSO 1605 that the NCP 145 creates when it detects a create VSO event (e.g., when it is notified by API server 140 that it has received an API to create a VSO). A VSO in some embodiments maps a set of one or more L4 ports (e.g., a port range) and/or a protocol to an endpoint group of machines for providing the service. In some embodiments, the VSO API provides this mapping. FIG. 16 shows the VSO 1605 with a mapping attribute set that maps a port to a particular group of endpoints.

An example of the mapping specified by a VSO API is provided in the following YAML code.

apiVersion: vmware.com/v1
kind: VirtualServiceObject
metadata:
  name: service-1
spec:
  endpointGroup: epp-1
  ports:
    protocol: TCP
    port: 80

In this example, the VSO is called service-1, identifies an exposed endpoint group epp-1, and specifies that this endpoint group is reachable on TCP port 80.

A VSO in some embodiments is associated with one or more load balancers. In some embodiments, the VSO API can specify the set of load balancers associated with the VSO, but when the VSO API does not specify any load balancer, the control system 100 designates the load balancer(s) 415 of the VPC gateway 282 as the VSO's load balancers when the VSO is specified for an endpoint group in the VPC, or the load balancer(s) of the guest cluster gateway as the VSO' load balancer when the VSO is specified for an endpoint group in the guest cluster. In FIG. 16, the VSO 1605 includes a load balancer identifier that identifies a load balancer object 1610 representing a load balancing construct 1620 in the VPC.

The NCP 145 creates the load balancing object 1610 to represent the load balancing elements 1620, which can be a set of one or more centralized load balancers (such as the load balancers 415 of the VPC gateway) or a set of one or more distributed load balancing engine (such as load balancing engines 815). The NCP also creates an association (e.g., a reference) between the VSO 1605 and the load balancing object 1610. It also creates an endpoint group object 1615 when the group of endpoint machines 1630 is defined, and creates an association (e.g., a reference) between the VSO 1605 and the endpoint group object 1615 upon creating the VSO 1605.

The VSO API in some embodiments also specifies an internal scope and/or external scope for the virtual service. The internal scope specifying that the virtual service is available to machines inside of the VPC, while the external scope specifies that the virtual service is available to machines outside of the VPC. In some embodiments, the network control system automatically allocates an internal VIP address for the virtual service when the internal scope is specified, while automatically allocating an external VIP address for the virtual service when the external scope is defined as the VSO's scope. As indicated in an exemplary API discussed below by reference to FIG. 19, when the external scope is left empty or refers to a load balancer, the external VIP is associated with the load balancer specified by the VSO or the gateway load balancer.

As shown in FIG. 16, the NCP 145 uses the VSO 1605, the load balancing object 1610 and the endpoint group object 1615 to allocate the internal VIP and/or external VIP for the service, and to generate one or more load balancing rules for the load balancer set 1620 to implement the virtual service. Each load balancing rule 1655 includes (1) a match criteria set that comprises the VIP and the port/protocol set that are used to map the exposed service to the endpoint group, and (2) an action criteria set that comprises a set of one or more identifiers (e.g., an endpoint group identifier) that identify machines in the endpoint group of machines specified for the virtual service by the API referring to the VSO CRD. As shown, the load balancers then use the load balancing rules to distribute data messages from client machines 1625 that are addressed to the VIP address (with the VIP as their destination IP addresses) along the port/protocol associated with the VSO 1605 among the machines 1630 in the endpoint group.

For the external scope, the load balancing rules in some embodiments are implemented by the gateway router (e.g., VPC or GC gateway router), or a set of load balancers used by the gateway router. For the internal scope, the load balancing rules in some embodiments can be implemented by the gateway router (e.g., VPC or GC gateway router), or a set of load balancers used by the gateway router, and/or by a distributed load balancer implemented by load balancing engines executing on host computers along with the client VMs and Pods that use the virtual service. In some embodiments, the VSO API specifies one or more different types of load balancers for performing load balancing operations with respect to the virtual service for one or more different types of data message traffic. In some embodiments that use Kubernetes APIs, the VSO API can use ClusterIP and Load Balancer types as its designated load balancing type(s), or a loadbalancer defined through the load balancing CRDs.

Figure 17:
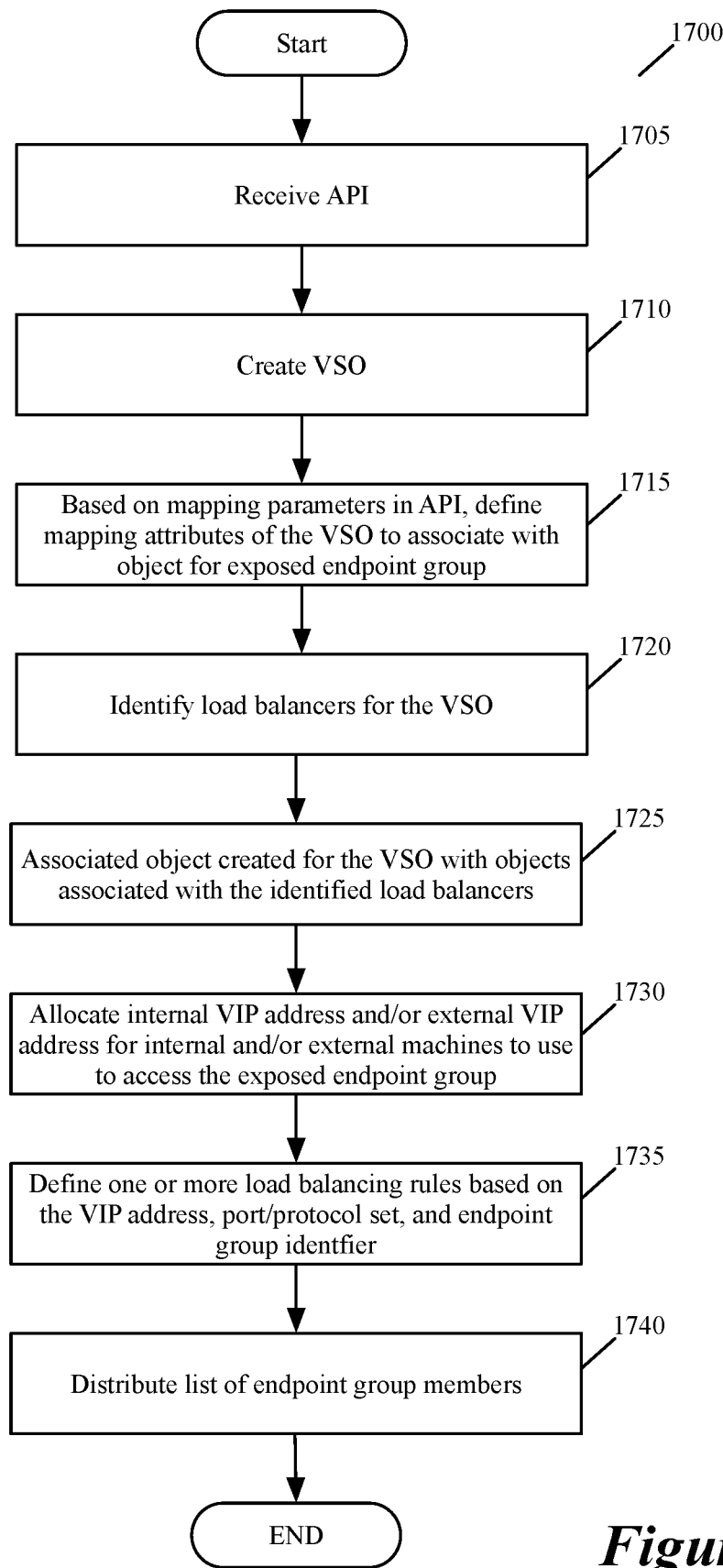
FIG. 17 conceptually illustrates a process for defining and using a VSO.

FIG. 17 conceptually illustrates a process 1700 that the NCP 145 performs in some embodiments to deploy and use a VSO. In some embodiments, the NCP 145 directs the SDN controller 115 (through the SDN manager 110) to perform one or more operations to implement some of the operations illustrated in FIG. 17. As shown, the process 1700 starts (at 1705) when the API server 140 receives an API to create a VSO. Next, at 1710, the NCP creates a VSO object with a mapping attribute set that per the mapping parameter set expressed in the received API, maps a set of one or more L4 ports (e.g., a port or port range) and/or a protocol to an endpoint group of machines for providing the service.

At 1715, the process creates an association between the VSO and the endpoint group exposed by the VSO. This endpoint group is specified in the received API in some embodiments. In some embodiments, the NCP 145 creates an object to represent the endpoint group when it receives an API that defines the endpoint group. As endpoint groups can have different types of machines, VSOs can be used in some embodiments to expose in a load-balanced manner different types of machines that perform the same service or compute operations. To create the association between the VSO and the endpoint group, the process 1700 in some embodiments defines a reference in the VSO to the endpoint group.

Next, at 1720, the process 1700 identifies a set of one or more load balancers associated with the VSO. As mentioned above, the VSO API in some embodiments specifies the set of load balancers associated with the VSO, but when the VSO API does not specify any load balancer, the NCP designates gateway load balancer(s) (e.g., VPC or GC gateway load balancers) as the VSO's load balancers. At 1725, the process creates an association between the VSO object with one or more objects that the NCP has previously created to represent one or more load balancers that it identified as being related to the VSO.

At 1730, the process 1700 allocates an internal VIP address and/or an external VIP address depending on whether the VSO has an internal scope, an external scope, or both. The scope of the VSO is specified by the VSO API in some embodiments. An allocated VIP address is provided to the administrators and/or automated processes of the VPC for distribution to client-side machines that will use the VIP address to access the service or compute operations provided by the endpoint group exposed by the VSO.

After the allocation of the VIP address(es), the process 1700 defines (at 1735) a set of one or more load balancing rules for distributing the internal and/or external data message flows that are addressed to the allocated VIP address(es) among the members of the associated endpoint group. In some embodiments, the load balancing rules are generated with a set of load balancing criteria that control how the data message flows are distributed among the endpoint groups. Next, at 1740, the process 1700 distributes the set of load balancing rules to the set of load balancers identified at 1720, and then ends. The SDN controllers in some embodiments periodically collect statistics regarding the load on the endpoint group machines, and based on the collected statistics, modify the load balancing criteria from time to time, and distribute the modified load balancing criteria to the load balancers.

FIGS. 18 and 19 illustrate examples of a VSO CRD 1800 and a VSO API 1900. The VSO CRD defines the metadata and specification sections, with the metadata attribute including a name field, and the specification section include a group, version, scope, name and sub-resource attributes. The VSO API 1900 specifies an external scope for the VSO. Because it specifies a particular load balancer (lb-1), the VIP that is allocated for the VSO attaches to the specified load balancer. When the scope does not specify a specific load balancer, the allocated VIP is associated with the cluster (e.g., VPC or GC) gateway router.

The VSO API also specifies three different set of ports/ protocols to expose three different services, called serviceX, serviceY, and serviceZ. All three services will be accessible with the same VIP address, but along different sets of ports/protocols. ServiceX is exposed along TCP port 8080, serviceY is exposed along UDP port 5353, and serviceZ is exposed along TCP ports 80, 443, 8000-10000.

In the VSO API, (1) serviceX is associated with an endpoint group defined by Kubernetes, which is identified by a reference to a Kubernetes defined object, (2) serviceY with an endpoint group called EPA, and (3) serviceZ is associated with an endpoint group called epgB. As noted in the annotations in the code, an endpoint group can be identified in some embodiments by a unique identifier (uid) for the endpoint group; otherwise, it is identified by its name in the namespace specified for the endpoint group. Also, when the namespace is omitted for the endpoint group, the endpoint group's namespace is assumed to be the same namespace as the VSO.

Some embodiments use a Load Balancer CRD to define the configuration for a load balancer service. In some embodiments, settings defined through the Load Balancer CRD apply as default values to the L4/L7 routes bound on a particular load balancer service. A virtual network in some embodiments defines the bindings between the load balancer service and a gateway router (e.g., a VPC gateway router). By default, the load balancer service in some embodiments is placed on the gateway router cluster (e.g., the VPC gateway router cluster or a GC gateway router).

In some embodiments, an API that refers to a Load Balancer CRD to create a load balancer service can also refer to a virtual network CRD to specify that the load balancer is for that virtual network. As discussed above, a virtual service object serves as a linking object between a load balancer object and an endpoint object in some embodiments. The load balancer object in some embodiments can link a virtual network object (e.g., a virtual network) with a virtual service object and an endpoint group object.

FIG. 20 illustrates an example of a Load Balancer CRD, while FIG. 21 illustrates an example of an API that refers to such a CRD to create a load balancer cluster. This API names the load balancing cluster in its metadata section and specifies a number of optional attributes in its specification section. These includes (1) an httpConfig to support http/http routes, (2) virtualIP that can be auto-allocated, (3) a port attribute to define one or more ports associated with the load balancer, and (4) a virtual network name. Like other APIs that create other extended resources based on CRDs, the load balancing API has a status section that defines the parameters to return as status. In this example, the returned status value is the external VIP associated with the load balancer.

Some embodiments utilize security CRDs to provide additional ways to specify security policies for the VPC or GC. For instance, the network control system of some embodiments uses Security Policy CRD to define security rules for filtering traffic between VPC network endpoints, which can be defined with endpoint group created by APIs referencing Endpoint Group CRDs. The endpoint groups in some embodiments can be specified as either source or destination for ingress or egress security rules (e.g., firewall rules). In some embodiments, such rules are enforced by distributed firewall engines executing on host computers (e.g., firewall engine 915) and/or edge appliances.

Endpoint groups in some embodiments can also be used to specify locations for applying the security policies that are defined through a Security Policy CRD. FIG. 22 illustrates a YAML example of an API that uses a Security Policy CRD. In this example, the endpoint group epp-2 is specified by an appliedToGroup field as the location for applying the security policy (called policy-1). This policy is applicable to data messages sent from the source endpoint group src-epp to destination endpoint group dst-epp along TCP port 80. FIG. 23 illustrates the Security Policy CRD in some embodiments of the invention.

In some embodiments, the appliedToGroup of the Security Policy API can be defined through the use of selectors. Examples of such selectors in some embodiments include VIF selectors, Pod selectors, Service selectors, etc. The Security Policy CRD provides the convenience of dynamic grouping, since existing solutions require manually association of an endpoint instance to a security group. Security Policy CRDs in some embodiments also support membership across different virtual networks defined through Virtual Network CRDs. Security Policy CRDs in some embodiments also support membership across different VPCs or different GCs. Hence, administrators in some embodiments can use Security Policy CRDs to define ingress/egress rules for traffic between two VPCs or two GCs. In some embodiments, the Security Policy CRDs allow administrators to define rules that specify the type of traffic to allow. In these embodiments, the APIs that refer to the Security Policy CRD are used to only define firewall rules that allow certain kind of traffic, as opposed to defining firewall rules that block other kind of traffic. Other embodiments, however, use the Security Policy CRD to define firewall rules that allow and/or deny traffic. In some of embodiments, the ingress/ egress firewall rules created through Security Policy CRDs are firewall rules enforced by the distributed firewall engines, as mentioned above.

Figure 24:
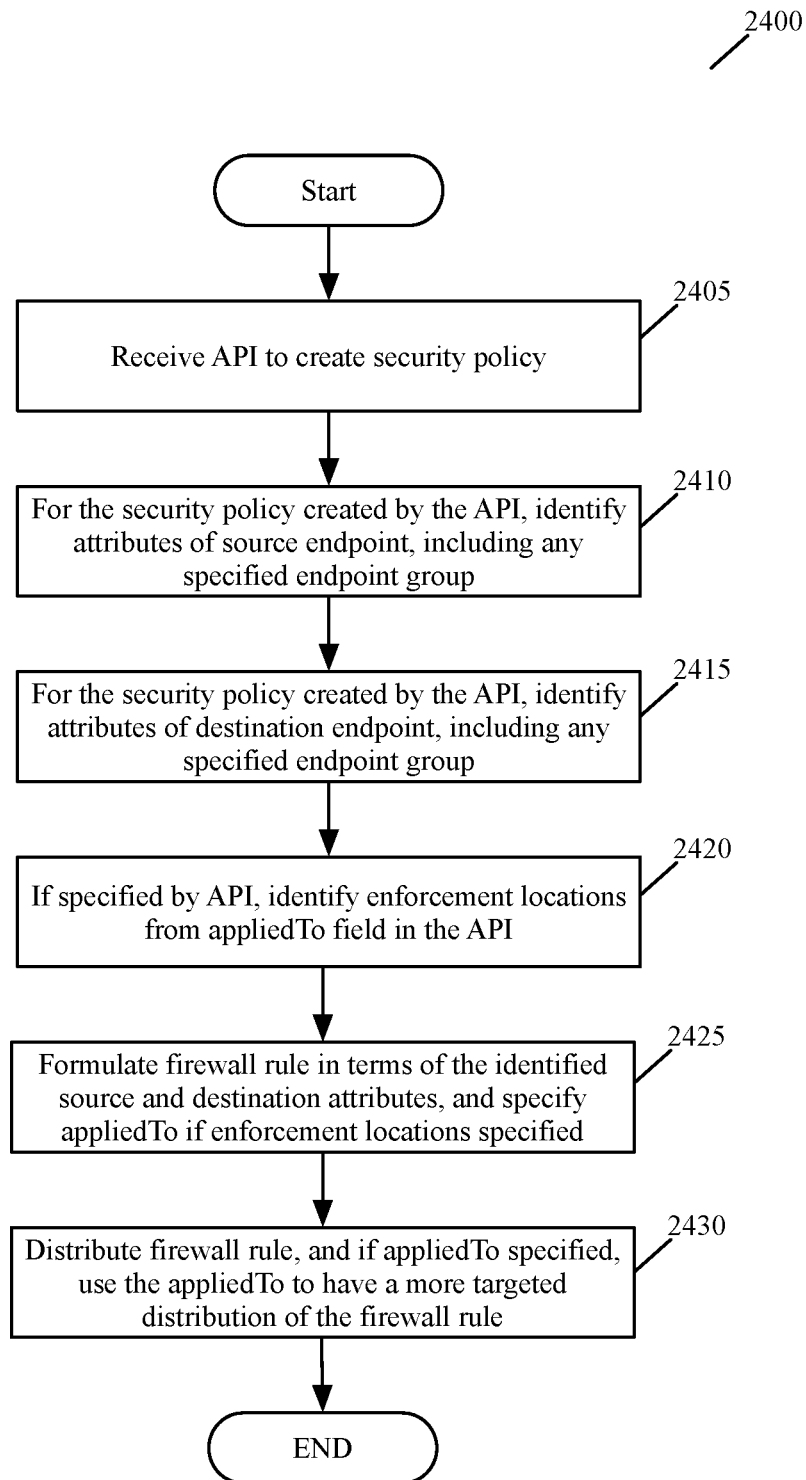
FIG. 24 illustrates a process for specifying a firewall rule based on an API that refers to a Security Policy CRD.

FIG. 24 illustrates a process 2400 that the NCP 145 and the SDN managers/controllers perform in some embodiments to process an API that refers to a Security Policy CRD. As shown, the process 2400 starts (at 2405) when the API server 140 receives the API and the NCP 145 is notified of a create security policy event. From the API, the process 2400 extracts (at 2410 and 2415) the parameters that explain the source and destination endpoints for flows to which the security policy applies. The source and destination endpoints can be specified in terms of the IP and port addresses. One or both of the endpoints can also be specified in terms of previously specified endpoint groups.

If an appliedTo field is specified by the API, the process 2400 identifies (at 2420) a set of enforcement locations for the security policy. Next, at 2425, the process formulates a firewall rule with the source and destination parameters identified at 2410 and 2415. This firewall rule has an appliedTo field set to the identifier(s) of the enforcement location(s) identified at 2420, if any such locations were identified. In the embodiments where the Security Policy CRDs allow administrators to define rules that specify the type of traffic to allow, the firewall rule specified at 2425 is defined with an Allow action parameter. The process 2400 distributes (at 2430) the specified firewall rule to distributed firewall engines that are to enforce this rule. When the appliedTo parameter is specified by the received Security Policy API, the distribution of the firewall rule is to a more limited set of distributed firewall engines that fall within the enforcement locations identified by the appliedTo field. After distributing the firewall rule, the process then ends.

The above-described FIG. 13 provided an example of a firewall rule that is specified by reference to an endpoint group identifier. Specifically, this example shows the endpoint group EPGj used as the destination IP value in a five-tuple match classification attribute of a firewall rule. In some embodiments, such a firewall rule would be created and distributed by the process 2400 in response to an API that identified the EPGj as the attribute that defines the destination endpoint of the security policy. Had the API specified an endpoint group to define the source endpoint attribute of the security policy, the generated firewall rule in some embodiments would use this endpoint group as the value of the source IP field in the five-tuple match classification component of the firewall rule.

Some embodiments provide Admin Policy CRDs as a mechanism for defining another type of security policies. These CRDs in some embodiments allow high priority security policies to be defined for an entire VPC or GC. In some embodiments, the security policies defined through the Admin Policy CRDs control the north/south traffic between the VPC and an external network (e.g., from another VPC, from an external IP block, or from outside of the availability zone in which the VPC is deployed). When a sub-network of a cluster (e.g., a sub-network 504-510) has its own gateway, some embodiments use Admin Policy CRDs to define security policies for the gateway to enforce. Similarly, in some embodiments, Admin Policy APIs control the north/south traffic between the GC and machines outside of the GC.

In some embodiments, the policies defined through Admin Policy CRD are implemented through firewall rules that are enforced by the VPC or GC gateway, or one or more firewalls used by the VPC or GC gateway. This is in contrast in some embodiments to the security policies that are defined through the Security Policy CRDs, which are enforced by distributed firewalls executing on the host computers with the source or destination VMs and Pods.

In some embodiments, security rules defined through Admin Policy APIs have higher priority over the security rules defined through Kubernetes Network Policies and through Security Policy CRD. With Admin Policy CRDs, VPC administrators can explicitly define inbound/outbound traffic for a VPC from/to another VPC or an external IP block, or define inbound/outbound traffic for a GC from/to another GC or an external IP block. The network control system of some embodiments leverages Kubernetes RBAC (role-based authentication controls) to make sure only the VPC administrator users can create, update, or delete Admin Policy CRDs of the VPC, and only the GC administrator users can create, update, or delete Admin Policy CRDs of the GC.

FIG. 25 illustrates an example of an Admin Policy CRD, while FIG. 26 illustrates an example of an API that uses an Admin Policy CRD. As shown, this API creates a policy called admin-policy-1, and has an appliedTo field that specifies that is associated with a VPC named vvpc-1. In some embodiments, the appliedTo value can be defined through selector constructs (e.g., vifSelector, podSelector, namespaceSelector and serviceSelector) that allow selection of constructs in the same namespace or different namespaces. The API in FIG. 26 defines two security rules, one on the ingress path (south side traffic) into the VPC and one on the egress path (north side traffic) from the VPC. The ingress side security rule specifies that all traffic from a particular IP address subnet should be allowed, while the egress security rule spaces that all traffic from a particular VPC (vvpc-2) should be dropped.

Figure 27:
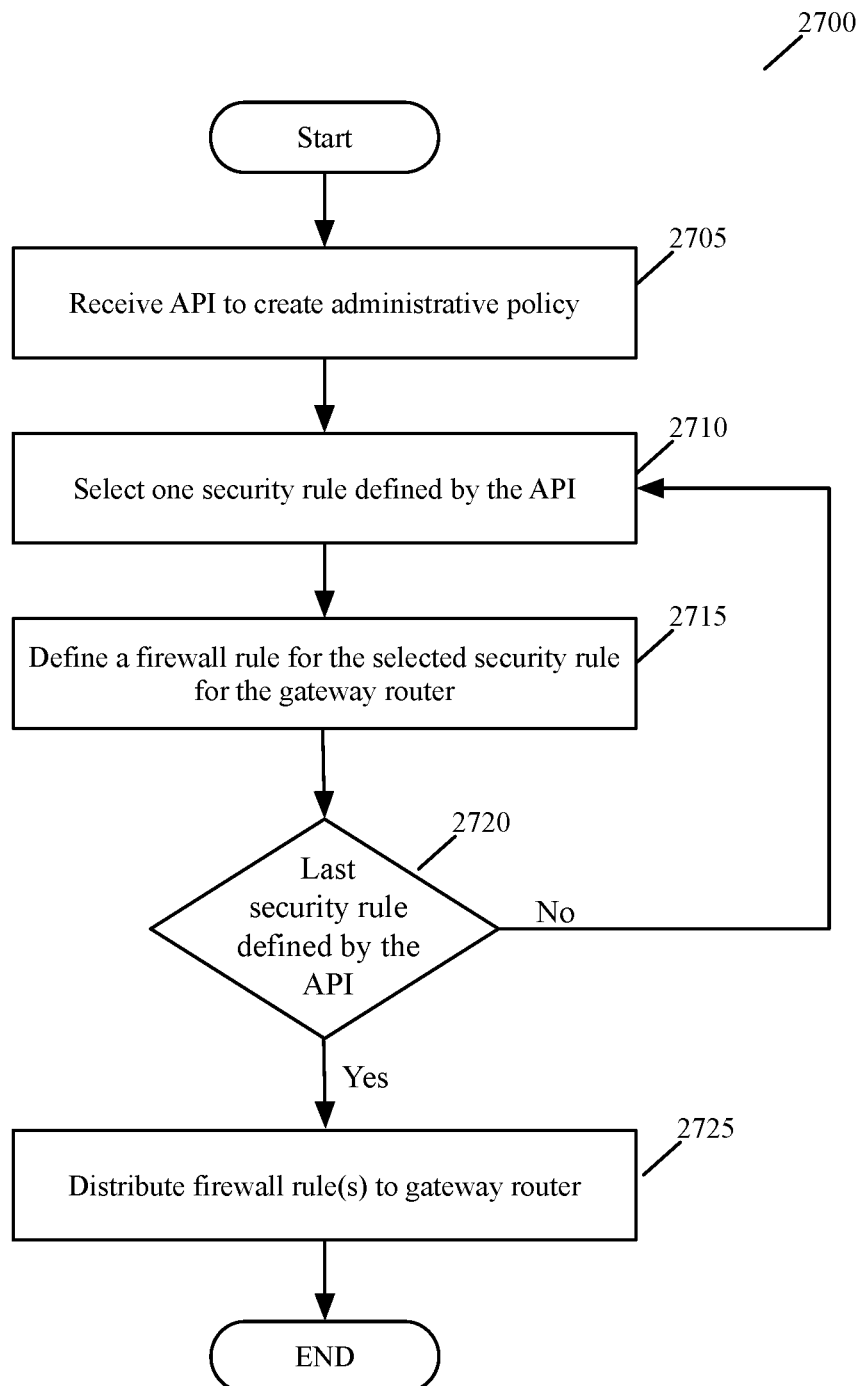
FIG. 27 illustrates a process for specifying firewall rules based on an API that refers to an Admin Policy CRD.

FIG. 27 illustrates a process 2700 that the NCP 145 and the SDN managers/controllers perform in some embodiments to process an API that refers to an Admin Policy CRD. As shown, the process 2700 starts (at 2705) when the API server 140 receives the API and the NCP 145 is notified of a create admin policy event. From the API, the process 2700 extracts (at 2710) the parameters associated with one security rule defined by the API. Next, at 2715, the process formulates a firewall rule from these extracted parameters (e.g., defines a firewall rule that specifies that all data messages from 172.168.0.1/24 should be allowed in the example illustrated in FIG. 26). This policy rule is for enforcement at the gateway router of the VPC or GC for which the Admin Policy is defined.

At 2720, the process 2700 determines whether it has processed all security rules defined by the API. As illustrated by the YAML example in FIG. 26, an Admin Policy API can specify multiple security rules. When the process 2700 determines that it has not processed all the security rules, it returns to 2710 to select and process another security rule. Otherwise, it transitions to 2725, where it distributes the specified firewall rule(s) to gateway router(s) for which it defined the firewall rule(s), and then ends.

Figure 28:
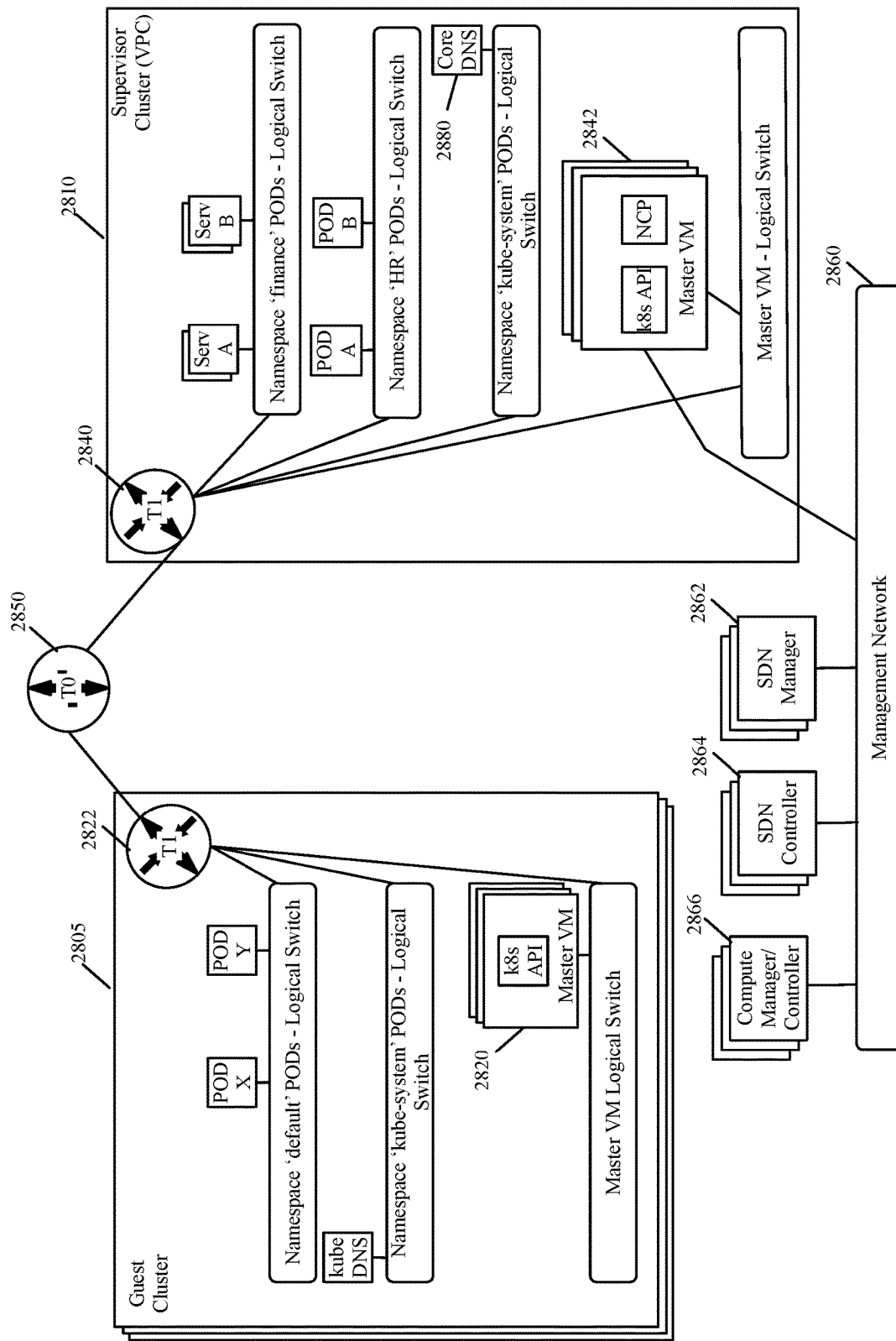
FIG. 28 illustrates an example of a guest cluster.

FIG. 28 illustrates an example of a guest cluster 2805 working conjunctively with a VPC 2810. In this example, the guest cluster 2805 is one of three guest clusters defined for the VPC. Like different VPCs that can be defined for the same entity or different entities (different tenants) in an availability zone, different guest clusters can be defined for a VPC. The different guest clusters in some embodiments include different types of workloads. Also, in some embodiments, one or more guest clusters are defined within the same namespace as the corresponding VPC.

As shown, the guest cluster 2805 includes several workload Kubernetes Pods that execute on several host computers that are part of the guest cluster. In this example, the guest cluster 2805 includes a logical network with multiple network segments defined by a logical switch. The guest cluster 2805 has a cluster of master VMs 2820 with a Kubernetes API server executing on each master VM to deploy Pods in the guest cluster. It also has a logical gateway router 2822 that connects to the logical gateway router 2850 of the availability zone.

In some embodiments, each of these logical gateway routers as well as the logical gateway router 2840 of the VPC 2810 are similar to the gateway router 282 of FIG. 2. As such, they include distributed and centralized routing components, with at least two redundant pairs of centralized routing components. In some embodiments, the guest cluster router 2822 and the VPC router 2840 connect through their respective distributed routing components. The VPC 2810 includes a logical network with one or more logical sub-networks each of which has one or more network segments with each network segment defined by a logical switch. In some embodiments, the GC logical network is a sub-network of the VPC logical network.

The VPC 2810 also includes a cluster of master VMs 2842, each of which is similar to the Kubernetes master VM 135 of FIG. 1. In some embodiments, a master VM 2842 connects through one of its VNICs to the management network 2860 to communicate with the SDN managers 2862, which in turn communicates with the SDN controllers 2864. The SDN managers/controllers are for deploying and configuring forwarding and service elements for the VPC.

Compute elements (e.g., VMs and non-Kubernetes Pods) are deployed through compute managers/controllers 2866.

Some embodiments auto-configure the networking elements of the guest cluster 2805 and the VPC with a baseline set of rules to achieve several different objectives. These rules can be modified by the administrators of the VPC and/or guest cluster, but ensure a common starting point of policies for all VPCs and GCs. For instance, these baseline policies ensure that no two VPCs can exchange data messages, as each VPC is initially defined as its own segregated tenant namespace/network. Similarly, these policies ensure that no two GCs can exchange data messages, as each GC is initially defined as its own segregated namespace/network.

Figure 29:
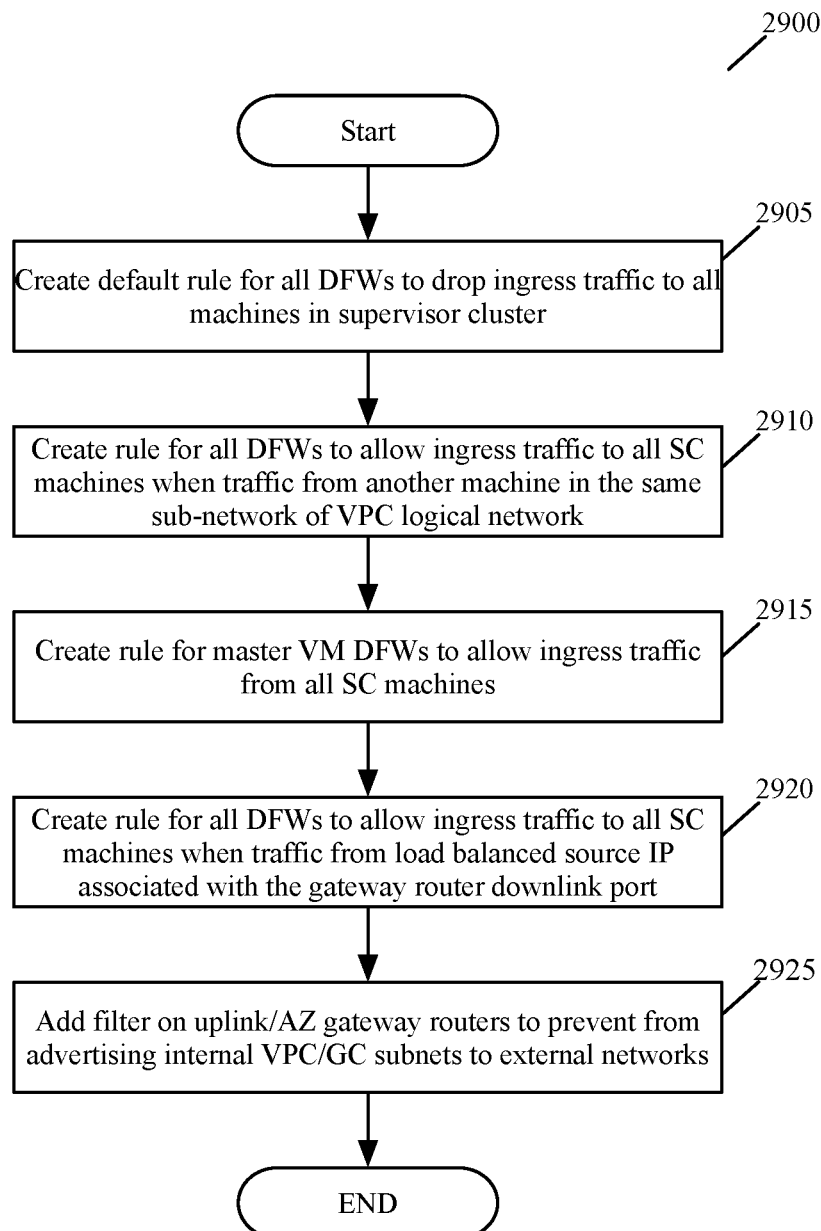
FIGS. 29 and 30 illustrate processes for defining baseline set of rules for a VPC and a guest cluster.
Figure 30:
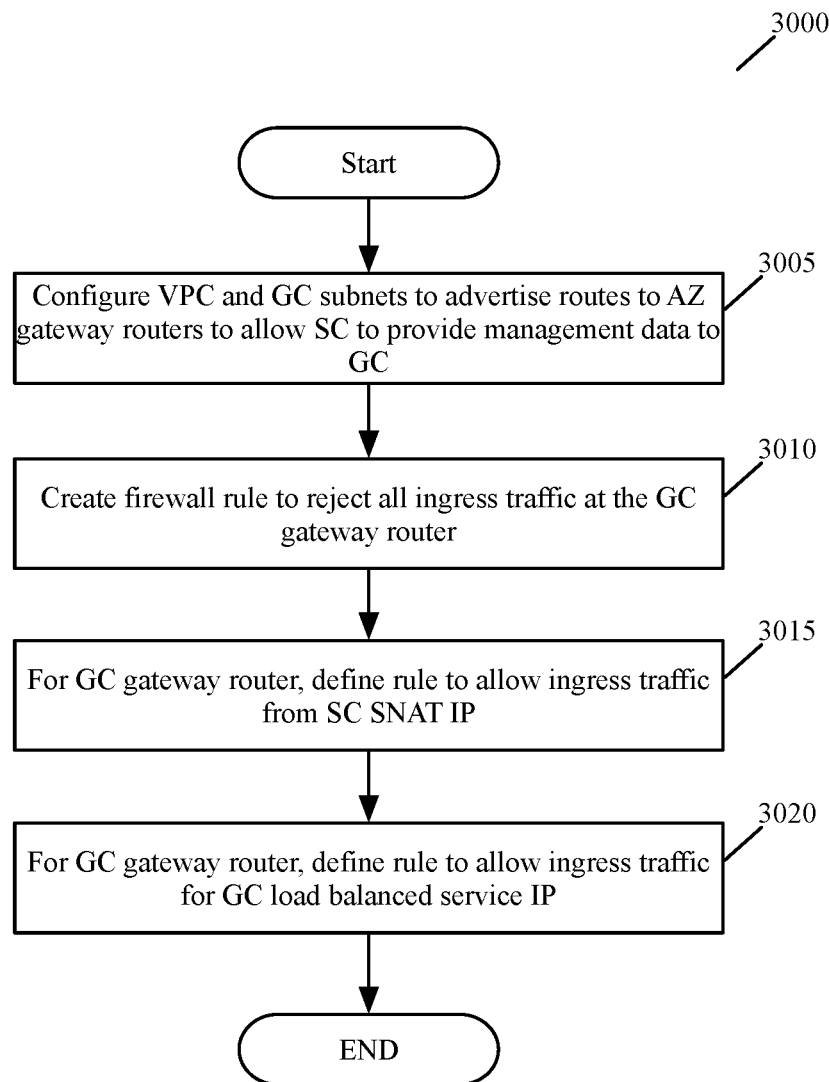

FIGS. 29 and 30 illustrate processes 2900 and 3000 for configuring the VPC and GC network elements with the baseline set of rules. As shown in FIG. 29, the process 2900 initially defines (at 2905) a default catchall rule for the DFW engine of each VM and non-Kubernetes Pod in the VPC 2810 to reject all ingress traffic to the VM or Pod. Next, at 2910, the process defines a rule for the DFW engine of each VM and non-Kubernetes Pod in the VPC 2810 to allow data messages from inside the same namespace and the VM or non-Kubernetes Pod. The same namespace for each particular VM or non-Kubernetes Pod in some embodiments includes the machines (VMs or Pods) in the same logical sub-network as the particular VM or Pod.

In the example illustrated in FIG. 5, each of the virtual networks 504-510 is one logical sub-network. Hence, at 2910, the process 2900 defines a firewall rule for a particular DFW of particular VM in one of these virtual networks to allow data messages from other VMs or Pods in the same virtual network. Data messages from Pods or VMs in different logical sub-networks will be dropped by default due to the default catchall rule defined at 2905. Like most of the other default rules, an administrator can define rules to allow data messages from one VPC logical sub-network (e.g., one virtual network) to reach another VPC logical sub-network (e.g., another virtual network).

At 2915, the process 2900 defines a DFW rule for each master VM 2842 to allow ingress traffic to allow traffic from all VPC and GC machines (VMs, non-Kubernetes Pods and Kubernetes Pods) to reach master VM. This is to allow all machines to access the master VM services (e.g., DNS requests to master VM for the core DNS service 2880 to perform).

Next, at 2920, one or more firewall rules are defined to allow traffic from outside of the VPC (e.g., from outside of the availability zone) to reach a load balanced service from the LB source IP, which is the IP of the gateway router downlink port. The process 2900 in some embodiments defines one rule to allow this traffic at the VPC gateway router, and a DFW rule for the DFWs of the load-balanced machines that provide the service. In some embodiments, the VIP address of the load-balanced service is advertised outside of the VPC (e.g., outside of the availability zone), while most other internal VPC IP addresses are not advertised.

At 2925, the process 2900 configures a filter on the availability zone gateway router (router 2850 in FIG. 28) to prevent the gateway router from publishing to its routing neighbors (e.g., BGP neighbors) the VPC IP subnet addresses. This is because the external network should not know of the VPC network unless one or more services are exposed through VIP addresses and ports as internal services provided to external machines.

In some embodiments, the gateway router 2840 of the VPC 2810 and the gateway router 2822 of the GC 2805 perform SNAT operations on the egress data messages of the VPC and GC that leave the availability zone. As shown in FIG. 30, the process 3000 configures (at 3005) the VPC and GC gateway routers 2840 and 2822 to advertise their routes to the AZ gateway router 2850 to allow machines in their respective clusters to access machines in the other cluster. For instance, the VPC machines (e.g., VMs or Pods) in some embodiments connects through SSH with GC machines (e.g., Kube Pods) for debug purposes or bootstrapping operations. In some embodiments, the VPC master VM also pushes management plane data to the GC master VM.

At 3010, the process 3000 defines a default rule to reject all ingress traffic at the gateway router 2822 of the guest cluster 2805. This default rule is set to ensure that traffic cannot be exchanged by default between guest clusters. However, to allow traffic from the VPC machines, a rule is defined (at 3015) to allow ingress traffic at the GC gateway router 2822 from the VPC SNAT IP. Also, at 3020, the process defines a rule to allow ingress traffic at the GC gateway router 2822 that relates to a GC load balanced service (e.g., allow data messages with destination IP addresses that matches a load balanced service IP of the GC). In some embodiments, no default rules are defined for blocking data message exchanges between machines (e.g., Kubernetes Pods) in the same guest cluster.

In some embodiments, the GC can access a VPC load balanced service through a VIP for this service. In some such situations, the gateway router 2822 of the GC performs an SNAT on the traffic egressing the GC to enter the VPC. Conversely, however, some embodiments do not perform an SNAT operation on traffic from the VPC that access a load balanced service (e.g., LB type Service or Ingress) of the GC. To prevent this SNAT operation, no SNAT rules are added to the gateway router 2840 of the VPC for such a service access.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 31:
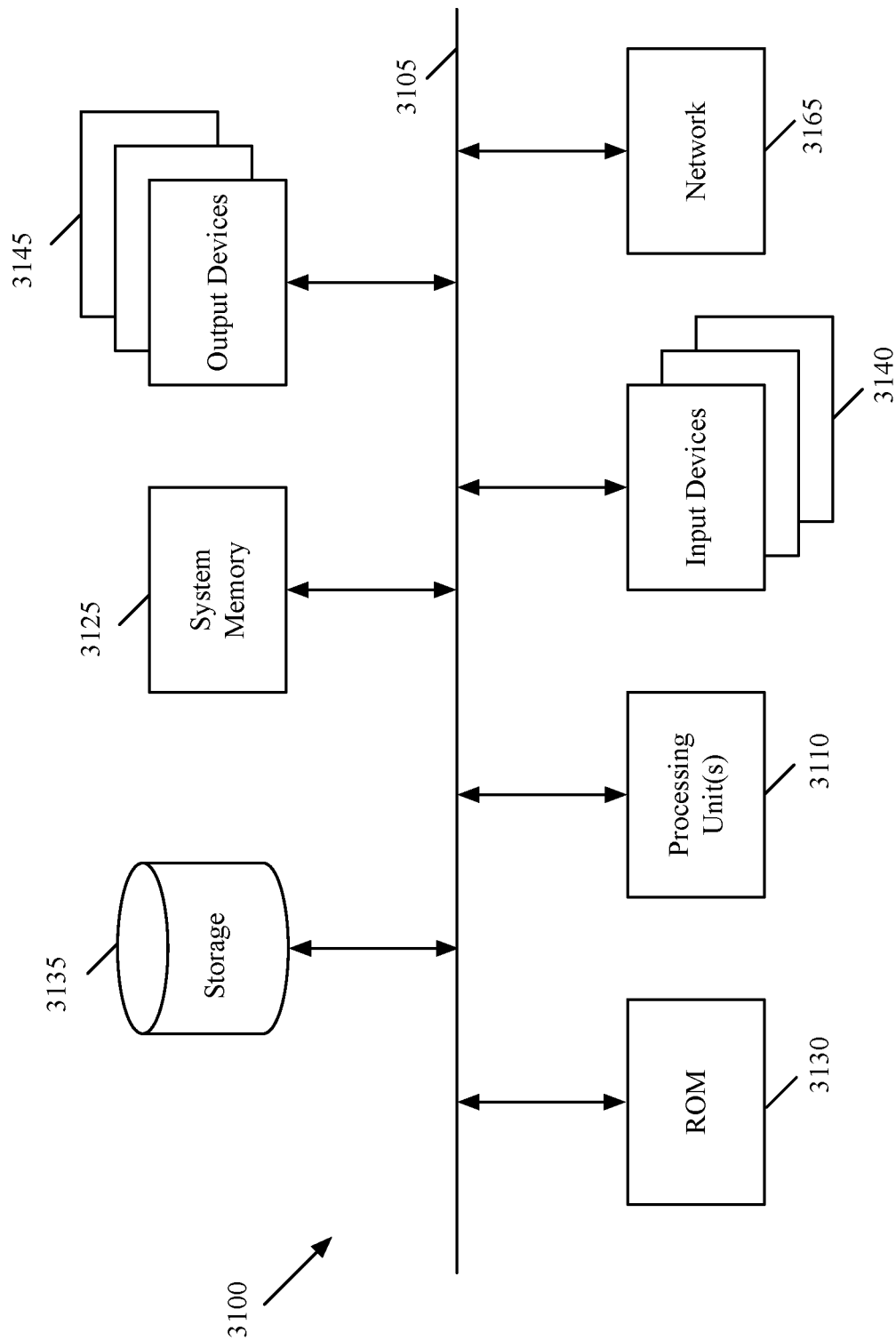
FIG. 31 conceptually illustrates a computer system with which some embodiments of the invention are implemented.

FIG. 31 conceptually illustrates a computer system 3100 with which some embodiments of the invention are implemented. The computer system 3100 can be used to implement any of the above-described hosts, controllers, and managers. As such, it can be used to execute any of the above described processes. This computer system includes various types of non-transitory machine readable media and interfaces for various other types of machine readable media. Computer system 3100 includes a bus 3105, processing unit(s) 3110, a system memory 3125, a read-only memory 3130, a permanent storage device 3135, input devices 3140, and output devices 3145.

The bus 3105 collectively represents all system, peripheral, and chipset buses that communicatively connect the numerous internal devices of the computer system 3100. For instance, the bus 3105 communicatively connects the processing unit(s) 3110 with the read-only memory 3130, the system memory 3125, and the permanent storage device 3135.

From these various memory units, the processing unit(s) 3110 retrieve instructions to execute and data to process in order to execute the processes of the invention. The processing unit(s) may be a single processor or a multi-core processor in different embodiments. The read-only-memory (ROM) 3130 stores static data and instructions that are needed by the processing unit(s) 3110 and other modules of the computer system. The permanent storage device 3135, on the other hand, is a read-and-write memory device. This device is a non-volatile memory unit that stores instructions and data even when the computer system 3100 is off. Some embodiments of the invention use a mass-storage device (such as a magnetic or optical disk and its corresponding disk drive) as the permanent storage device 3135.

Other embodiments use a removable storage device (such as a floppy disk, flash drive, etc.) as the permanent storage device. Like the permanent storage device 3135, the system memory 3125 is a read-and-write memory device. However, unlike storage device 3135, the system memory is a volatile read-and-write memory, such as random access memory. The system memory stores some of the instructions and data that the processor needs at runtime. In some embodiments, the invention's processes are stored in the system memory 3125, the permanent storage device 3135, and/or the read-only memory 3130. From these various memory units, the processing unit(s) 3110 retrieve instructions to execute and data to process in order to execute the processes of some embodiments.

The bus 3105 also connects to the input and output devices 3140 and 3145. The input devices enable the user to communicate information and select requests to the computer system. The input devices 3140 include alphanumeric keyboards and pointing devices (also called "cursor control devices"). The output devices 3145 display images generated by the computer system. The output devices include printers and display devices, such as cathode ray tubes (CRT) or liquid crystal displays (LCD). Some embodiments include devices such as touchscreens that function as both input and output devices.

Finally, as shown in FIG. 31, bus 3105 also couples computer system 3100 to a network 3165 through a network adapter (not shown). In this manner, the computer can be a part of a network of computers (such as a local area network ("LAN"), a wide area network ("WAN"), or an Intranet), or a network of networks (such as the Internet). Any or all components of computer system 3100 may be used in conjunction with the invention.

Some embodiments include electronic components, such as microprocessors, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Several embodiments were described above that use certain CRDs. One of ordinary skill will realize that other embodiments use other types of CRDs. For instance, some embodiments use LB monitor CRD so that load balancing monitors can be created through APIs that refer to such a CRD. LB monitors in some embodiments provide statistics to reflect the usage and overall health of the load balancers. Also, while several example above refer to container Pods, other embodiments use containers outside of Pods. Thus, one of ordinary skill in the art would understand that the invention is not to be limited by the foregoing illustrative details, but rather is to be defined by the appended claims.

We claim:

1. A method of deploying network elements for a set of machines in a set of one or more datacenters, the method comprising:

performing automated processes to deploy a logical network to connect the set of machines, said performing the automated processes comprising:

parsing an intent-based API (Application Programming Interface) (i) that references a security policy Custom Resource Definition (CRD) defining a security policy as a custom-specified resource in the datacenter set and (ii) that defines additional attributes for one or more security policies that are defined by reference to the security policy CRD and that are associated with the logical network;

configuring a plurality of forwarding elements executing on a plurality of host computers to define a logical forwarding element (LFE) for the logical network to connect the set of machines executing on the plurality of host computers to each other;

deploying a gateway router to connect the LFE to a network external to the logical network; and configuring the gateway router to perform firewall operations on data messages entering or exiting the logical network from or to the external network, said configuring comprising using the CRD to define firewall rules.

2. The method of claim 1 further comprising receiving the CRD, wherein the security policies are to be implemented as firewall rules enforced by a firewall device used by the gateway router serving as the ingress/egress node of the logical network.

3. The method of claim 2, wherein the intent-based API specifies two or more security policies by reference to the CRD, each security policy to be implemented as a firewall rule enforced by the firewall device.

4. The method of claim 1, wherein the gateway router is configured to perform the firewall operations by receiving a set of firewall rules that the gateway router enforces.

5. The method of claim 1, wherein the gateway router is configured to perform the firewall operations by receiving a set of rules to redirect a set of traffic associated with the logical network to a set of one or more firewall devices to perform the firewall operations.

6. The method of claim 1, wherein performing the automated processes further comprises using a template to configure the plurality of forwarding elements and the gateway router without an administrator performing any action to direct the configuration after the intent-based API has been parsed.

7. The method of claim 1, wherein the intent-based API comprises (i) a set of policy fields that specify at least one security policy and (ii) an appliedTo field to identify the logical network to which the security policy applies.

8. The method of claim 7, wherein the intent-based API comprises a plurality of sets of policy fields that specify a plurality of security policies, with at least one security policy specified for egress traffic through the gateway router out of the logical network and another security policy specified for ingress traffic through the gateway router into the logical network.

9. A method of deploying network elements for a set of machines in a set of one or more datacenters, the method comprising:

receiving a Custom Resource Definition (CRD) that defines attributes for security policies associated with ingress/egress nodes of a logical network; and performing automated processes to parse intent-based API (Application Programming Interface) requests:

to configure a plurality of forwarding elements executing on a plurality of host computers to define a logical forwarding element (LFE) for the logical network to connect the set of machines executing on the plurality of host computers to each other;

to deploy a gateway router to connect the LFE to a network external to the logical network; and to configure the gateway router to perform firewall operations on data messages entering or exiting the logical network from or to the external network, wherein the API requests comprise at least one particular API request that specifies at least one security policy by reference to the CRD and the security policy is to be implemented as a firewall rule at the gateway router serving as an ingress/egress node of the logical network.

10. The method of claim 9, wherein the intent-based API specifies two or more security policies by reference to the CRD, each security policy to be implemented as a firewall rule at the gateway router serving as the ingress/egress node of the logical network.

11. A non-transitory machine readable medium storing a program for deploying network elements for a set of machines in a set of one or more datacenters, the program comprising sets of instructions for:

performing automated processes to deploy a logical network to connect the set of machines, the sets of instructions for performing the automated processes comprising sets of instructions for:

parsing an intent-based API (Application Programming Interface) (i) that references a security policy Custom Resource Definition (CRD) defining a security policy as a custom-specified resource in the datacenter set and (ii) that defines additional attributes for one or more security policies that are defined by reference to the security policy CRD and that are associated with the logical network;

configuring a plurality of forwarding elements executing on a plurality of host computers to define a logical forwarding element (LFE) for the logical network to connect the set of machines executing on the plurality of host computers to each other;

deploying a gateway router to connect the LFE to a network external to the logical network; and configuring the gateway router to perform firewall operations on data messages entering or exiting the logical network from or to the external network, said configuring comprising using the CRD to define firewall rules.

12. The non-transitory machine readable medium of claim 11, wherein the program further comprises a set of instructions for receiving the CRD, wherein the security policies are to be implemented as firewall rules at the gateway router serving as the ingress/egress node of the logical network.

13. The non-transitory machine readable medium of claim 12, wherein the intent-based API specifies two or more security policies by reference to the CRD, each security policy to be implemented as a firewall rule at the gateway router serving as the ingress/egress node of the logical network.

14. The non-transitory machine readable medium of claim 11, wherein the program further comprises a set of instructions for receiving the CRD, wherein the security policies are to be implemented as firewall rules enforced by a firewall device used by the gateway router serving as the ingress/egress node of the logical network.

15. The non-transitory machine readable medium of claim 14, wherein the intent-based API specifies two or more security policies by reference to the CRD, each security policy to be implemented as a firewall rule enforced by the firewall device.

16. The non-transitory machine readable medium of claim 11, wherein the gateway router is configured to perform the firewall operations by receiving a set of firewall rules that the gateway router enforces.

17. The non-transitory machine readable medium of claim 11, wherein the gateway router is configured to perform the firewall operations by receiving a set of rules to redirect a set of traffic associated with the logical network to a set of one or more firewall devices to perform the firewall operations.

18. The non-transitory machine readable medium of claim 11, wherein the sets of instructions for performing the automated processes further comprises a set of instructions for using a template to configure the plurality of forwarding elements and the gateway router without an administrator performing any action to direct the configuration after the intent-based API has been parsed.

19. The non-transitory machine readable medium of claim 11, wherein the intent-based API comprises (i) a set of policy fields that specify at least one security policy and (ii) an appliedTo field to identify the logical network to which the security policy applies.

20. The non-transitory machine readable medium of claim 19, wherein the intent-based API comprises a plurality of sets of policy fields that specify a plurality of security policies, with at least one security policy specified for egress traffic through the gateway router out of the logical network and another security policy specified for ingress traffic through the gateway router into the logical network.

* * * * *